US012206782B2

(12) United States Patent
Holmes-Mitra et al.

(10) Patent No.: US 12,206,782 B2
(45) Date of Patent: Jan. 21, 2025

(54) MULTI-DIRECTIONAL ZERO-KNOWLEDGE ATTESTATION SYSTEMS AND METHODS

(71) Applicant: GLIMPSE PROTOCOL LIMITED, London (GB)

(72) Inventors: Timothy Holmes-Mitra, London (GB); David Stoter, London (GB); Alasdair MacDonald, London (GB)

(73) Assignee: GLIMPSE PROTOCOL LIMITED, London (GB)

( * ) Notice: Subject to any disclaimer, the term of this patent is extended or adjusted under 35 U.S.C. 154(b) by 248 days.

(21) Appl. No.: 17/923,445

(22) PCT Filed: May 4, 2021

(86) PCT No.: PCT/EP2021/061626
§ 371 (c)(1),
(2) Date: Nov. 4, 2022

(87) PCT Pub. No.: WO2021/224210
PCT Pub. Date: Nov. 11, 2021

(65) Prior Publication Data
US 2023/0198765 A1   Jun. 22, 2023

(30) Foreign Application Priority Data
May 7, 2020   (GB) ..................................... 2006753

(51) Int. Cl.
*H04L 9/32* (2006.01)
*G06F 16/182* (2019.01)
*G06F 21/10* (2013.01)

(52) U.S. Cl.
CPC .......... *H04L 9/3221* (2013.01); *G06F 16/182* (2019.01); *G06F 21/10* (2013.01);
(Continued)

(58) Field of Classification Search
CPC ... H04L 9/3221; H04L 9/3228; H04L 9/3247; H04L 9/3263; H04L 9/0863; H04L 9/088;
(Continued)

(56) References Cited

U.S. PATENT DOCUMENTS 11,194,564 B1 * 12/2021 Dwivedi ................ H04L 67/10
2018/0181756 A1   6/2018 Campagna et al.
(Continued)

OTHER PUBLICATIONS

Fan Zhang et al: "DECO: Liberating Web Data Using Decentralized Oracles for TLS", arxiv.org, Cornell University Library, 201 Olin Library Cornell University Ithaca, NY 14853, Sep. 3, 2019 (Sep. 3, 2019), XP081472270.
(Continued)

*Primary Examiner* — Sm A Rahman
(74) *Attorney, Agent, or Firm* — Workman Nydegger

(57) ABSTRACT

Certain examples described herein relate to zero knowledge attestation systems and methods. In one example method, a computing entity obtains query data over at least one network from a messaging service. A query defined by the query data is matched against private data for the computing entity. A use-limited private-public key pair is obtained for the query and an identifier is generated or the computing entity using the public key. A query result package is then generated based on a match for the query. The query result package includes the generated identifier and acts as a zero knowledge attestation. The computing entity obtains content associated with the query that is addressed to the identifier uses the private key of the private-public key pair to authenticate communications that relate to the query.

20 Claims, 13 Drawing Sheets

(52) U.S. Cl.
CPC .......... *H04L 9/3228* (2013.01); *H04L 9/3247* (2013.01); *H04L 9/3263* (2013.01)

(58) Field of Classification Search
CPC ....... H04L 9/0897; H04L 9/3218; H04L 9/50; H04L 51/00; H04L 63/0414; H04L 63/0428; H04L 63/20; G06F 16/182; G06F 21/10; G06F 16/9535; G06F 21/6263; G06F 21/57
See application file for complete search history.

(56) References Cited

U.S. PATENT DOCUMENTS

2020/0084483 A1      3/2020   Brown et al.
2022/0368682 A1*    11/2022   Verzun .................. G06F 21/606

OTHER PUBLICATIONS

International Preliminary Report on Patentability received for PCT Patent Application No. PCT/EP2021/061626, mailed on Nov. 17, 2022, 9 pages.
International Search Report and Written Opinion received for PCT Patent Application No. PCT/EP21/061626, mailed on Jun. 11, 2021, 11 pages.

* cited by examiner

MULTI-DIRECTIONAL ZERO-KNOWLEDGE ATTESTATION SYSTEMS AND METHODS

TECHNICAL FIELD

The present invention relates to distributed computing methods and systems. In particular, the present invention relates to a multi-directional zero-knowledge attestation protocol. Certain examples involve querying a set of computing entities over a network, and the subsequent distribution of content to those entities based on the querying. The examples may be used within distributed computing, mobile telephony and so-called Internet of Things applications.

BACKGROUND

Distributed computing systems are now ubiquitous in the modern age. The parallel development of wireless and mobile networking technologies and small form-factor portable computing devices means that over half the population of the world own a smartphone. Over the past decade, so-called cloud computing services, where computing services are provided by remote servers to local (and often thin) client devices, have grown from a niche to the preferred way for many to access online services. This has been coupled with an explosion of embedded and wearable devices that are connected across global networks. Sensor devices now transmit data that ranges from stress measurements in large civil engineering projects to personal medical monitoring data.

The growth of computing networks and device penetration has occurred in a largely ad-hoc manner. Communications for even mission critical applications are performed using the many protocols of the Open Systems Interconnection (OSI) 7-layer model. Indeed, the success of modern computer networking is in large part due to the flexible manner in which data may be communicated across a patchwork of interconnected networks using a variety of different underlying technologies. However, this presents a continual security risk. This risk increases as cloud computing services are increasingly interconnected via back-end systems and Internet-accessible application programming interfaces (APIs). Even if point-to-point communications are encrypted, a complex computing service is open to attack at its weakest point, which may be a single unsecured network connection or a software library with a vulnerability. Every day there are reports of new vulnerabilities and security breaches, despite previous assertions of systems being "secure". Security becomes even more of an issue as cloud computing services are increasingly used to provide state services, healthcare and infrastructure control. This is coupled with an exponential increase in the number of data generating devices—in 2020 it is estimated that 28 Petabytes ($10^{15}$ bytes) of data is created by wearable devices every day.

Several differing technical solutions have been presented to manage the increasingly complex world of distributed computing. EP 3248364 B1 describes the use of an intermediate network device in a service provider network to enable the modification of network requests to provide enhanced functionality. The examples described therein use a rotating network identifier that is inserted into a network request that is receivable by a server device located outside of the service provider network. An association between the network identifier and data originating from the service provider network is constructed via a mapping that exists for the predefined time period. In certain examples, a data broker is introduced within the telecommunications network. The data broker may be configured based on the aforementioned mapping between the network identifier and data originating from the service provider network. The data broker is adapted to use the mapping to provide data to the server device. This may be considered network identification as a service as the data broker is configured to supply data originating from within the service provider network as a computing service to the server device. While this provides some additional security, it requires access to the service provider network and data is still transmitted over unsecured and untrusted networks; the remote server device needs to be trusted to use the data appropriately.

There is thus a desire to provide more secure methods of communicating across networks of distributed devices, and/or to provide methods that consider the security of different entities within a set of distributed devices, e.g. a provider of computing services and a consumer of computing services.

US2020/084483 A1 describes a system and methods to enable advertisers, publishers, and consumers to interact to provide well-targeted advertisement impressions, while preserving consumer privacy. The system and methods described therein are said to enable accurate and reliable targeting of advertisements without the need for privacy-invasive tracking and collection of consumer information by advertisers or publishers. Instead, it is said that the consumer retains complete control of his or her own private information, even while that private information is used for programmatic targeting of advertisements. The disclosed system and methods utilize blockchain as a tool for arbitrating data, which is said to account for, and help to eliminate, fraud, costly arbitrage, and brand safety concerns.

US2020/084483 A1 uses a decentralised network to implement the blockchain. This includes decentralised random beacons and so-called watchtowers. The watchtowers are server computing devices that are associated with a producer of agent software that runs upon consumer devices. They act as a controlling device. The watchtowers are responsible for operating one or more blockchains on the decentralised network that are used to enable the service of targeted advertisements to consumer devices. Each watchtower has a duty of care to the network and plays a supervisory or oversight role with respect to consumer devices that operate with a particular variant of agent software that is produced by the entity that operates a respective watchtower. The watchtower is used to verify or validate blocks added to the blockchain by consumer devices. As shown in FIGS. 7 and 8 of US2020/084483 A1, a watchtower is used to validate software agent signatures and validate proofs of ad selection.

US2018/181756 A1 is a patent publication in a field that is unrelated to the selective distribution of content to a plurality of client entities. Instead, US2018/181756 A1 relates to the problem of managing a virtual computing environment. In particular, US2018/181756 A1 describes methods and systems that allow a user of a virtual computing environment to confirm that the computing environment complies with an appropriate configuration. For example, before deploying an application or interacting with a service hosted on a virtual computer system, a customer may desire proof that the virtual computer instance is configured with an authentic image, that the host of the virtual computer instance is properly configured, and that the host of the virtual computer instance is owned by the computing resource service provider.

The paper ""DECO: Liberating Web Data Using Decentralized Oracles for TLS" by Fan Zhang et al of Cornell University (published on arXiv on 3 Sep. 2019) teaches an extension to the Transport Layer Security (TLS) cryptographic protocols. The paper addresses the problem that users cannot provide to third parties the provenance of private data, i.e. that it came from a particular website. The paper provides a solution in the form of a three-party handshake that involves a server S, a prover P and a verifier V.

All of the above citations teach different incompatible systems that address different problems. While US2020/084483 A1 provides one possible solution to the provision of targeted content to a consumer device without the need for privacy-invasive tracking and collection of consumer information, the specific solution involving blockchain technology and the watchtower devices adds additional complexity and risks for identity disclosure. For example, if a watchtower device is attacked or goes offline, then agents on consumer devices are unable to perform the described methods. Also, although short-term ephemeral cryptographic identities are used, a set of long-term agent cryptographic identities need to be registered with both the advertising blockchain and a specific watchtower. Each watchtower needs to issue and store pairs of rotating ephemeral identities that are randomly selected by consumer devices, and the registration messaging needs to be secured. The watchtower also needs to store the long-term cryptographic identities of consumer devices to validate requests for rotating ephemeral identifiers. Not only does this require the watchtowers to be online, and so tie-in the consumer device to a specific producer of agent software, it means that the watchtowers store lists of the long-term cryptographic identities and so could be attacked to ascertain the association between long- and short-term identifiers. There is thus a challenge of how to make US2020/084483 A1 more secure and easier to implement.

SUMMARY

Aspects of the present invention are set out in the appended independent claims. Certain variations of the invention are then set out in the appended dependent claims.

BRIEF DESCRIPTION OF THE DRAWINGS

Examples of the invention will now be described, by way of example only, with reference to the accompanying drawings, in which.

DETAILED DESCRIPTION

Introduction

Figures 1A, 1B:
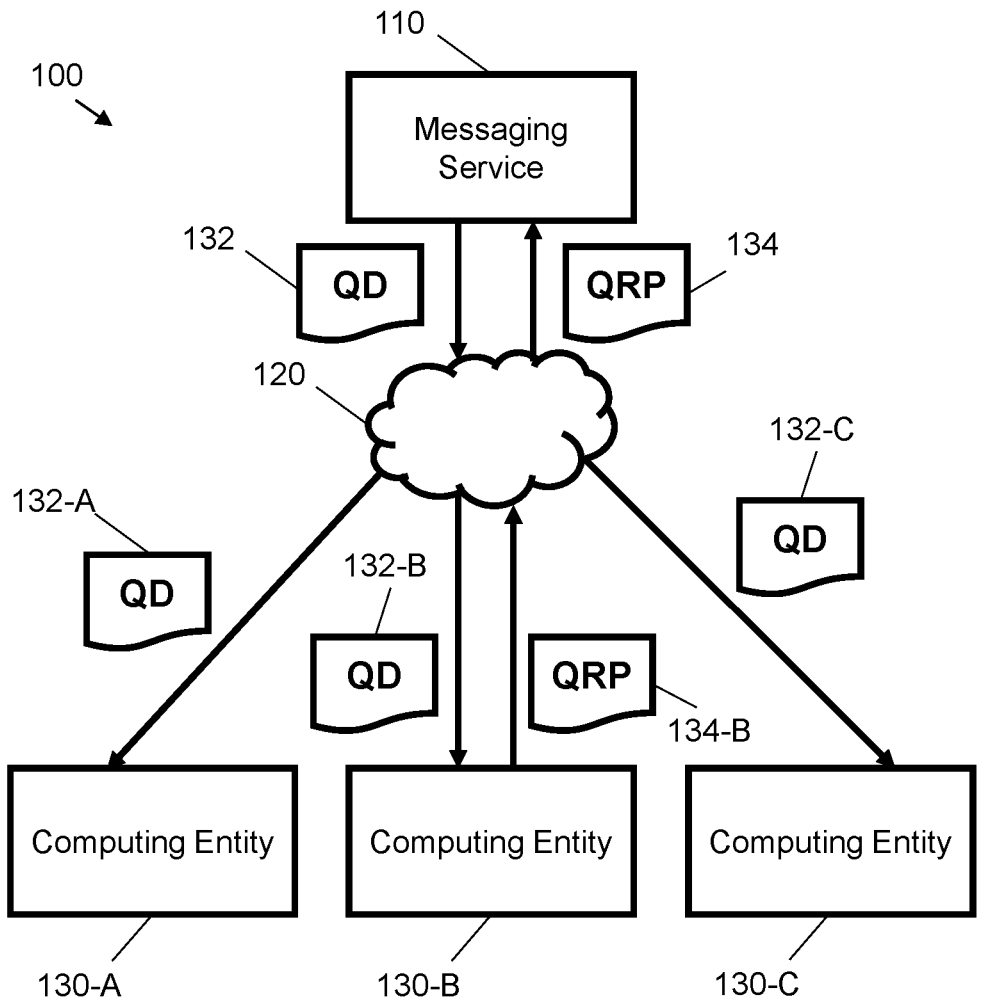
FIG. 1A is a schematic illustration showing a system for the interrogation of a set of computing entities according to an example.
FIG. 1B is a schematic illustration showing example query data and an example query result package.

Certain examples described herein provide multi-directional zero-knowledge attestation systems and methods to interact with a set of computing entities over a computer network. The examples allow the set of computing entities to be queried in order to selectively receive content, including text, images, video, audio and commands. Certain examples are directed to security from the perspective of a computing entity, e.g. with regard to their private data.

Certain examples are multi-directional in that they allow for communication between a computing entity and an untrusted device, e.g. from the untrusted device to the computing entity and from the computing entity to the untrusted device. The term "untrusted" is used broadly here to mean that the device is not trusted to have access to data that is accessible to the computing entity. By implementing the examples, a computing entity does not need to "trust" third party devices and networks; communications may be open and unbiased. A computing entity may respond to a query, without needing to "trust" the query creator and associated computing devices; in particular, a computing entity does not need to trust that a receiving device is going to correctly process their data, as the receiving device never has access to the data, and "trust" does not become an issue. The present examples may allow for a communications protocol with the characteristics of transparency and immutability, similar to how the Internet Protocol (IP) is implemented. Additionally, the present examples may be implemented using a messaging service that is based on distributed computing technologies, such as distributed file systems and/or distributed ledgers.

Certain examples provide a zero-knowledge solution. This applies a combination of cryptographic approaches to secure an entity's data from untrusted parties. The present examples provide a solution that works on a presumption that any data transmitted by a computing entity provides a security risk, regardless of the trustworthiness of the recipient. While seeming overly cautious at first glance, and going in a different direction to many solutions that secure communications and end points, this approach works surprisingly well when the ad-hoc construction of modern distributed computing systems is considered. For example, there are many servers that are said to be "secure" but that are later found to have unanticipated flaws and vulnerabilities that demonstrate the claim of "security" was an illusion. Moreover, it is often difficult, if not impossible for users to verify service providers' security claims, e.g. due to a lack of access or system complexity.

The present approaches are borne from a realisation that even data encrypted with state-of-the-art methods on remote server devices, such as passwords or private data, are often "insecure" in practice. This is evidenced by the daily discovery of exploits and human errors (notwithstanding malicious attacks) that lead to the disclose of private data. Furthermore, it is often assumed that because the underlying algorithm of a security standard or protocol is considered "secure", that the "secured" data must also be protected. However, in practice, implementations of these standards or protocols have many variables and, if these are incorrectly set, the security may be comprised regardless of the so-called "security" of the underlying algorithm.

In the present approaches, communications are performed according to a zero-knowledge protocol, such that the computing entity is able to convey to untrusted devices that they know (i.e. have access to) some data without conveying any information apart from the fact that they know (i.e. have access to) the data. This forms the "attestation" part of the solution, the computing entity is able to prove the existence of some data by providing confirmable evidence, but without providing the data itself.

Although examples are presented in terms of a computing entity "knowing" or "having access" to some data, they cover many different possible use cases. Queries may relate to some property of a user or computing entity—e.g. the computing entity "is an" X, where the property is accessible as a data field for the computing entity. For example, queries may relate to a computing entity being in a particular location; in this case, "being" may be considered a form of "knowing" (e.g. having "access" to location data).

In the present approaches, the evidence is provided using at least cryptographic approaches. This allows the data to remain private, e.g. remain within a known controlled secure location, while still enabling interaction with other devices. Hence, these untrusted devices may work with the computing entity without requiring access to the computing entity's private data. The examples further provide for continued communications to and/or from the computing entity without leaking private data (e.g., including even IP addresses).

Certain examples described herein provide methods and systems for the secure selective distribution of content over a set of computing entities. These methods and systems implement the multi-directional zero-knowledge attestation approaches described above.

The term "computing entity" is used as a collective term to refer to different agents that may undertake actions within the examples. In a simple case, a computing entity may be a physical device, such as a sensor device constructed from logic circuitry such as Field Programmable Gate Arrays (FPGAs) and/or Application Specific Integrated Circuits (ASICs), or user equipment (e.g., a mobile computing device such as a mobile or "smart" phone or a tablet device) that comprises one or more central processing units (CPUs) that execute computer program code to instantiate an operating system and application software. In more complex cases, a computing entity may comprise a virtual device, such as a virtualised computing instance that is accessed via a thin client terminal, and/or a user-specific agent implemented by CPU-executed computer program code (e.g., different users of a multi-user operating system such as a Unix-based system may have different kernel-level processes). In general, a computing entity is associated with a physical computing device. In certain cases, there may be one computing entity per physical computing device. In other cases, many computing entities may be implemented using a common physical computing device, e.g. a computing entity may be an instantiated agent implemented using computer program code on a physical computing device.

In certain examples described herein, the computing entities form a set. This may comprise a set of computing entities that are communicatively coupled to at least one network, such as is implemented by a plurality of devices communicatively coupled to public networks like the Internet. The set of computing entities may be referred to as a distributed computing environment, as the computing entities may be located in diverse physical locations, comprise different implementations (e.g., a mixture of the above instantiations on different physical devices) and/or may be communicatively coupled over wide and changing network infrastructure. Heterogeneity may thus be considered the default context.

The set of computing entities need not comprise all accessible computing entities on a network. In some cases, a set of computing entities may comprise one or more subsets of computing entities. For example, a set or subset of computing entities may form a private network that is then connected to a different wider network. This may be the case when a family's set of computing entities are connected so they can provide redundancy between each other and/or allow for changing network ingress and egress routes. The networking of each computing entity may be provided using a wide variety of approaches, including virtual private network (VPN) couplings and couplings to different local and wide-area topologies.

Certain examples described herein provide for secure selective distribution of content. Content here may comprise any data that is receivable by a computing entity. It may comprise image data, video data, audio data, text data, machine-readable data to be rendered via an output device, executable computer program code (such as compiled binaries and/or higher-level scripts), commands for execution and/or multimedia data that combines different modalities. The examples relate to the distribution of content in the form of supply of content to one or more computing entities. Content may be encrypted, encoded and/or compressed for communication to a computing entity over a network. In examples, the distribution is secure and selective. The selectiveness of the distribution arises through a querying approach wherein content is conditionally available for communication to computing entities based on at least the result of the querying. For example, some computing entities in the set will be able to download the content, while others in the set will not be able to download the content. The querying is performed according to a zero-knowledge attestation protocol, whereby a computing entity does not communicate any private data, rather it provides evidence that it has certain values within the private data. This evidence is prepared using at least cryptographic approaches. In particular, the evidence is provided as a query result package. In this context, a private-public (i.e. asymmetric) key pair may be used to generate portions of the query result package. For example, the public key of the private-public key pair may be used to generate a public identifier that is used as part of an addressing mechanism and the private key may be used to generate digital signatures and provide non-repudiation for the query result package. This private-public key pair may be configured to be use-limited, e.g. to be associated with a present query but uncorrelated with future and/or past queries. These approaches provide security, especially the security of the private data. In certain later examples, the private-public key pair may also be used to provide an element of forward secrecy and protection against eavesdroppers over time.

The examples described herein are considered "secure" (i.e. deemed to provide "security") in that an entity maintains control of its private data, e.g. restrict access to a set of one or more trusted devices including the computing entity while denying access to untrusted devices associated with the query or other actors (malicious or otherwise). Certain examples thus allow a user of a computing device to retain full control of their private data and allow for useful communications between third parties without the third parties accessing that private data for possible future misuse and/or exploitation. For example, third parties may be able to query a state of a complex technical system (such as a healthcare monitoring system or aircraft) without needing to expose sensitive details of the system. It should be noted that reference to "security" here is independent of the methods used to secure communications (e.g., end-to-end and/or back-end encryption) and/or any applied authentication methods for those communications (e.g., conventional username/password authentication). These may be additionally implemented as a matter of practice.

Example Distributed System and Method

Figure 1C:
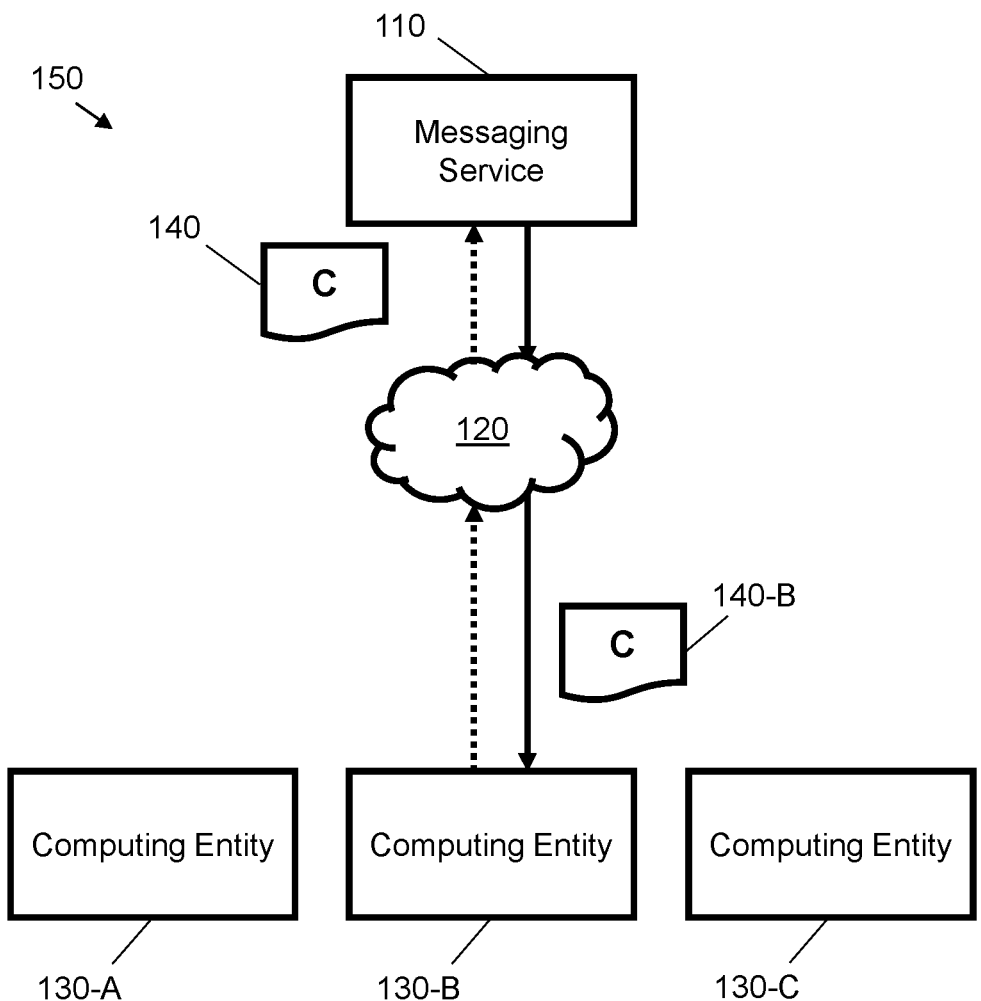
FIG. 1C is schematic illustration showing content exchange over the system of FIG. 1A.
Figure 1D:
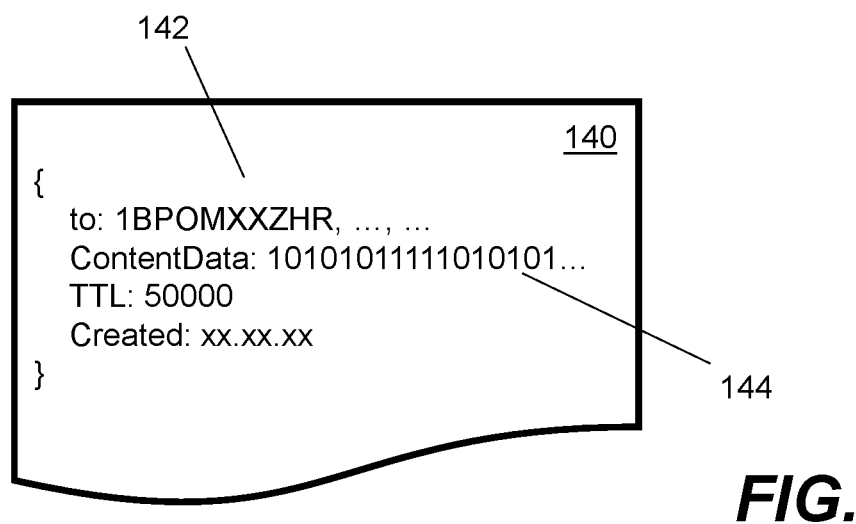
FIG. 1D is a schematic illustration showing example content data for the example of FIG. 1C.

FIGS. 1A to 1D show a first example of a distributed computing system. The distributed computing system may be used to provide secure selective distribution of content across a set of computing entities. FIG. 1A shows a first view 100 of query data being exchanged across the distributed computing system. FIG. 1B shows examples of the data being exchanged. FIG. 1C shows a second view 150 of content being received by a particular computing entity. FIG. 1D shows an example of the content format.

The distributed computing system shown in FIGS. 1A and 1C comprises a messaging service 110, one or more networks 120, and a set of computing entities 130. The messaging service 110 may be implemented by one or more server computing devices. The one or more networks 120 may comprise one or more wired and/or wireless networks such as wide-area networks (WANs), local area networks (LANs) and peer-to-peer or personal area networks (PANs). The computing entities may be communicatively coupled in variety of ways and may be grouped within private networks or sets that connect to a wider LAN or WAN. As an example, three computing entities 130-A, 130-B and 130-C are shown, but actual implementations may involve thousands or hundreds of thousands of entities. Although communications are shown with individual computing entities, actual communication pathways may differ and may comprise complex couplings through multiple physical and/or logical networks. The set of computing entities 130 may be configured as described above and below and may differ in instantiation. To ease understanding, it may be assumed that the set of computing entities 130 are smartphone devices that are each operated by a user (although this should not be considered limiting).

The messaging service 110, the one or more networks 120 and the set of computing entities 130 may form part of a trustless system, i.e. the computing entities 130 do not need to trust the messaging service 110 (and/or other network devices) for the system to operate successfully. In a trustless system, communications may be structured according to an open protocol with transparency (e.g. of how communications are to be configured) and immutable properties (e.g. no single entity within the group can change how communications are to be structured and sent). For example, in this trustless system, the broadcast and the associated processing of messages occurs "in the open", and according to a known, auditable, and verifiable set of rules (i.e. that form the open protocol). In one case, the bytecode for computations, and source code, may be available for inspection, e.g. via a public ledger. In certain implementations, the messaging system may comprise one or more of a distributed ledger and a distributed file system. A distributed ledger may be based on a blockchain, a set of records or blocks that are cryptographically linked. For example, a given block may comprise a hash of a previous block. A distributed ledger may be implemented across a number of nodes (i.e. computing devices) arranged within a peer-to-peer network. Data for the distributed ledger may be synchronised between nodes and confirmed using consensus algorithms. A distributed file system may comprise similar components, e.g. a collections of nodes (i.e. computing and/or storage device) where data is stored in a distributed manner across the nodes.

In the present examples, the computing entities 130 are configured such that they do not communicate private data outside of a virtual sphere (or ring) of control for each entity. This allows communications over a trustless system. It also means that the computing entities 130 do not require a guarantee of the security of communications, e.g. across the networks 120 or to the messaging service 110. This may be the case despite security measures being implemented, such as authentication (e.g., logging into the messaging service 110), encryption on the back-end of the messaging service 110 and communication over HTTPS. In other cases, for example sensor networks for civil engineering, protocols like the Advanced Message Queuing Protocol (AMQP) may be used. The messaging service 110 may operate according to a trustless protocol (e.g., as described above) and the one or more networks 120 may not be trusted.

The messaging service 110 may provide a set of messages that are downloadable by one or more computing entities 130. The messaging service 110 may be implemented as one or more processing threads on one or more CPUs.

Messages within the messaging service 110 may be addressed to one or more of the computing entities 130. The computing entities 130 may access the messaging service 110 using conventional technologies, e.g. via an API provided by the messaging service that receives HTTP(S) requests. For example, the messaging service 110 may implement a form of bulletin board in certain implementations. In other implementations where the messaging service 110 comprises one or more of a distributed ledger and distributed file system, a computing entity may be able to access messages as available data. For example, messages may comprise one or more blocks within the distributed ledger and/or downloadable data within the distributed file system. Although the messaging service 110 is shown as a singular entity for ease of explanation, it may also be implemented in a distributed manner across multiple server computing devices (e.g., to enable load balancing, database sharding and the like). In this case, a state of the messaging service 110 may be synchronised between separate server computing devices. The messaging service 110 may be implemented using any known messaging technology that provides the functionality described herein.

In one case, the messaging service 110 may comprise a database for the storage of messages. Messages may be accessed and downloaded by the computing entities 130, e.g. via the database in certain examples. In certain cases, the messaging service 110 may comprise a distributed storage system (e.g. similar to a content delivery network). In a distributed implementation, messages may be synchronised across distributed storage nodes, and may be differentially distributed based on message properties (e.g. geo-specific messages may only be stored on nodes within a corresponding locale). In one case, a node of the messaging service 110 may be located within a LAN (e.g. a home network) and sync itself with at least one other node across a WAN that is coupled to the LAN. A distributed ledger implementation may operate similarly; a computing entity may retrieve data from the ledger. Many different network configurations are possible and the example of FIGS. 1A to 1D is purposely simplified to allow for ease of explanation. Indeed, more complex network configurations may improve security by further obscuring message trails across the one or more networks 120.

In a distributed ledger implementation, nodes of the distributed ledger may comprise a copy of blocks of the ledger. In this case, a computing entity may retrieve messages by reading one or more blocks from an accessible node. Similarly, a computing entity may send replies by posting a transaction to an accessible node for inclusion in future blocks. The node may be within a LAN for the computing entity. In this case, a computing entity may communicate with the messaging service 110 without leaving their home network and thus shield their public IP address to all other actors in the system. The computing entity may also vary the node accessed for reading and/or writing of data and/or connect to nodes using secured communication channels (such as a VPN). Various degrees of security may be implemented depending on requirements.

In the example of FIG. 1A, the set of computing entities 130 each obtain query data 132 from the messaging service 110 over the one or more networks 120. An example set of query data 132 is shown in FIG. 1B. The query data 132 may comprise an address field. In a preferred case, the anonymity of the computing entities 130 with respect to the messaging service 110 may be preserved. In this case, query data (i.e. contained within a message) may be addressed to all computing entities 130, or to identifiers of one or more computing entities 130 (e.g., a subset of entities). The identifiers may be generated as described below with respect to FIG. 1B. In a preferred case, the identifiers are use-limited (e.g., ephemeral) and associated with a particular query or set of queries. In this case, a "pull" system of message communication may be enacted; whereby the computing entities retrieve query data that are addressed to all entities or their own generated identifiers. In this case, the computing entities 130 do not need to disclose private data to obtain appropriate query data, including disclosure of data such as an IP address that may give away location data and could be used to aggregate and track entities over time.

The query data in FIG. 1B then comprises data that defines a query to be performed on each of the addressed computing entities. A "query" may be said to be an interrogation or question to be asked of the computing entities 130, e.g. to be answered using private data that is only accessible to the computing entities 130. The query may take many different forms depending on the request. In certain cases, the query is to be executed against sensor data that is gathered by the computing entity but that is not to be transmitted outside of the computing entity. In certain cases, the query may be executed against data relating to, amongst others, one or more of: global positioning data, health device data (e.g., heart rate data, exercise and fitness data, blood pressure data, blood sugar data, blood type data, disease history data etc.), user data (e.g., defining characteristics of a user, name, address, physical characteristics, state security numbers etc.), computing device data (e.g., browser, computing device make and model, operating system etc.), application data (e.g., use of applications and/or applications installed), network data (e.g., network address, IP address, media access control—MAC address, International Mobile Equipment Identity IMEI number etc.), Internet of Things (IoT) telemetry data, and home device data (e.g., thermostat data, lighting data, heating, ventilation and air conditioning—HVAC—data, home security data etc.). In certain cases, queries may be executed against data that is generated by machine learning models that operate upon raw data for the computing entity. This is described in more detail in later examples.

In the example of FIG. 1B, the query data 132 relates to global positioning system (GPS) or location data held by the computing entities 130. In this case, the query data 132 defines a query that asks whether the computing entity 130 enters a particular location (e.g., similar to a so-called "geo-fence"). In FIG. 1B, this is defined via a "location" field that indicates an extent of the particular location based on a latitude (La) and longitude (Lo) and a defined tolerance (T)—e.g. an extent either side of a value for each. The query data 132 of FIG. 1B effectively asks of the computing entities 130: "are you within this area?". This definition is provided for example only; actual query data may be differently defined according to the query to be performed and/or the data being interrogated.

In FIG. 1B, the example query data 132 also includes query metadata. The query metadata may be defined as a set of constraints for the query and/or data relating to the properties of the query. In the example of FIG. 1B, there are two constraints. A first constraint is set via a "properties" field, which indicates properties of the computing entity and/or private data being interrogated. For example, in FIG. 1B, the properties indicate that mobile devices of make and model "XYZ" and "ABC" are to be interrogated. The properties may be parsed by the computing entities 130 as part of query execution; if properties are not met or matched, the query data 132 may be discarded (i.e. the query is not evaluated and no response is broadcast). Other examples of properties include user properties (e.g., certain user types or characteristics), sensor properties, and device configuration properties. A second constraint is set via a time-to-live (TTL) field. This defines a time constraint for execution of the query. In the present case, the TTL field is defined in associated with query metadata indicating a time of query data creation (the "Created" field). Hence, in this example, the query data 132 is only valid for 50000 seconds (~14 hours) from creation.

In general, query data may comprise one or more constraints that indicate which computing entities are to perform an associated query using the query data. As set out above, these constraints may be based on one or more of: an explicit address, computing entity properties, user properties and query properties. The actual query may comprise a Boolean expression, e.g. an expression that generates a Boolean value (i.e. 0/1 or false/true) when evaluated. The Boolean expression may comprise a series of one or more (sub) expressions that are joined by Boolean operators such as AND, OR and NOT. In the example of FIG. 1B, the query data 132 may be said to define a Boolean expression such as "LA=51.50±0.01 AND LO=0.0±0.1" where "1" or "True" is output if the computing entity is within the geo-fence and "0" or "False" is output if the computing entity is not within the geo-fence (e.g., where LA and LO are internal variables or measurements within the private data of the computing entity).

Returning to FIG. 1A, in this view 100, each computing entity 130 obtains query data 132 from the messaging service (indicated by query data 132-A, 132-B and 132-C) and uses this query data 132 to perform the defined query. This may comprise matching a query defined by the query data 132 against private data for the computing entity, the private data being stored within a secure data store. The secure data store may be local or remote to the computing entity (e.g., in the latter case, it may comprise an encrypted "cloud" or distributed data store). Matching the query may comprise evaluating a Boolean expression defined by the query data 132 (e.g., as discussed above) and determining a Boolean output. The query may be performed within a secured execution space for each computing entity. This may comprise executing the query using processes that are executed within a secured execution space (e.g. of an operating system) where reads and/or writes are monitored and/or authenticated. It may also comprise monitoring other input/output processes such as network communications. The secured execution space may comprise memory that is not accessible to unauthenticated processes. Generally, each computing entity has control over its secured execution space, and so controls the security of that space. Data that is written to non-volatile storage from the secured execution space may be encrypted prior to writing; likewise, private data may be decrypted following loading from non-volatile storage prior to executing the query. The only data output from the query execution that may not be secured is the Boolean value resulting from an evaluation of a Boolean expression, i.e. representing a result of the match (although in certain cases this may be encrypted if desired). As such, a result of the query, e.g. in the form of a Boolean match or no match, may be determined without leakage of the private data from the secure data store.

In certain examples, one or more additional mechanisms may be used to prevent and/or reduce leakage of private data. In one case, the confidentiality of the original query may be preserved in transit. This may be achieved using a form of hash tree structure. In another case, a mathematical zero knowledge proof may be included in a result. In yet another case, a guardian device may be used to associate the query and data relating to the query in a multi-party computation approach. In a fourth case, side channels may be used to additionally obtain and communicate query data. Different approaches and combinations of approaches may be implemented depending on requirements.

In FIG. 1A, the result of the query execution is prepared as a query result package 134 by one or more computing entities. In one case, a query result package 134 may only be prepared based on one result of the query execution, such as a positive match (i.e. Boolean "1" or "True"). In this case, no query result package may be prepared for a negative match (i.e. Boolean "0" or "False"). Of course, it should be noted that any Boolean expression may also be prepared as a negation of that expression and so the a "positive match" and "negative match" may involve output of different values (e.g., a NOT will turn an output of "1" into and output of "0") and should be interpreted broadly as referring generally to a match for a set of desired properties. In FIG. 1B, a query result package 134-B is prepared by the second computing entity 130-B, indicating that the second computing entity 130-B provides a match for the query defined within the query data, e.g. within the time constraints of the query data 132, the second computing entity 130-B is or was within the defined location and met the other defined constraints. In the example of FIG. 1B, the first and third computing entities 130-A and 130-C do not transmit query result packages 134. Non-transmittal of a query result package may occur for a variety of reasons, including one or more of: the computing entity did not have private data that matched the defined query; the computing entity was offline; the computing entity chose not to respond; the computing entity did not match indicated query constraints; the computing entity or another device experienced network failure; etc. In FIG. 1B, the query result package 134-B is returned to the messaging service 110 over the one or more networks 120. This may be performed using explicit network messaging and/or by writing data to a distributed ledger and/or distributed file system. For example, the second computing entity 130-B may append a block to a distributed ledger comprising the query result package (or a link to the package). The second computing entity 130-B may be able to do this by only communicating with a local node (e.g. on a more secure LAN) and/or may change the node that is accessed over time (e.g. a different node may be accessed for each query). As a distributed ledger is synchronised between nodes, writing to a local node of a distributed ledger that also has a remote server computing device node is functionally equivalent to transmitting a network message to the same server computing device.

In examples described herein cryptographic approaches may be used to provide an identifier for the computing entity. The identifier may be thought of as an address for the computing entity. It may be used in one or more of "pull" and "push" contexts for message retrieval. In preferred examples, the computing entities 130 retrieve messages on a pull basis from the messaging service 110 using the identifier, e.g. as and when a computing entity desires where the computing entity looks for messages that match its own set of identifiers and/or messages addressed to all entities. In certain examples, the identifier is generated based on a use-limited private-public key pair. In particular, the identifier may be generated based on the public key of the use-limited private-public key pair. The use-limited private-public key pair may be associated with the query defined by the query data 132. For example, the use-limited private-public key pair may be a private-public key pair that is determined for the query, wherein different use-limited private-public key pairs are obtained for subsequent queries. Hence, "use-limited" here means that the use of the private and public keys in the private-public key pair may only be used in relation to a particular query, and a new set of private and public keys may be generated per query. The private-public key pair may be generated using any suitable public key (i.e. asymmetric) cryptography method. In certain cases, a use-limited private-public key pair may be used for future queries that relate to a particular earlier query. In this case, "use-limited" may refer to use with a plurality or set of associated queries, e.g. that may all relate to a first or initial query. This is explained in more detail in later paragraphs.

An example query result package 134 is shown in FIG. 1B. In this example, the query result package 134 comprises the public key of the use-limited private-public key pair for the query as an identifier 136. The public key may be used directly as an identifier, or the identifier may be generated as a deterministic function of the public key. In the present example, the query result package 134 comprising the identifier 136 acts as a zero knowledge attestation, i.e. as evidence that the computing entity comprises private data that matches the query but without transmitting over the (trustless) distributed computing system any of the private data. In certain examples, instead of or as well as the identifier 136, the query result package may comprise a different zero knowledge proof that attests to the match. The zero knowledge proof may prove that the match function was executed correctly (e.g., in addition to the identifier and a digital signature for the query response package).

In certain examples, the computing entities 130 may apply various approaches to make it difficult for the system to be exploited by malicious parties. In one case, the computing entities 130 may implement a commit-reveal scheme. In this case, the computing entities may hash specific attribute values (e.g. such that the attribute values cannot be recovered from the hash), which are then digitally signed in the manner discussed above. At a later date, e.g. when the private data is stale or no longer needs to remain private, the computing entity may reveal the attribute value. For example, a timestamp may be hashed and then revealed at a later time. This process may indicate an integrity of a computing entity and indicate that time-based attributes are changing correctly over time. A commit-reveal scheme such as this may allow a 'honesty' score for the computing entity to be constructed over time. This may then be used as part of the attestation claim. In other cases, a trust score may be configured for mutual validation between different sets of computing entities.

In certain examples, e.g. instead of or as well as the example above, a computing entity may allow for further verification by a third party. For example, a trusted authority may validate an attribute value and provide a root certificate for digitally signing future claims related to that attribute (e.g. as well as the digital signature relating to the private-public key pair that is discussed above). This root certificate may be stored in a hardware security module such as a trusted platform module.

In certain examples, e.g. instead of or as well as the examples above, a proof-of-work cost may be associated with computing entities 130 that reply to a query. For example, a computing entity 130 may need to demonstrate that it took a particular number (e.g. 100) of clock cycles solving a defined mathematical problem and include this proof-of-work within the query result package 134. This may help avoid large scale exploitation, e.g. individual computing devices may easily produce the proof-of-work, but it makes it difficult for large scale "computing entity" farms to operate (e.g. in a malicious manner).

In examples, a computing entity may be further configured to use the private key of the private-public key pair to authenticate communications that relate to the query. For example, in FIG. 1B, the query result package 134 further comprises a digital signature 138 that is generated using the private key of the aforementioned use-limited private-public key pair, i.e. the private key that corresponds to the public key that forms the identifier 136. The digital signature 138 may comprise a digital signature that is generated by signing the query result package 134 with the identifier 136. The digital signature 138 may be bundled as part of the query result package 134 or may be supplied separately. The digital signature 138 may be verified using the public key that is supplied as the identifier 136. Digital signatures such as digital signature 138 may be used on future communications from the computing entity 130-B to indicate that communications relate to the query data 132 (i.e. the query defined by that data). The digital signature 138 is useable to authenticate the query result package 134 as originating from a computing entity that matched the query. It is thus useable to verify the message integrity and provide non-repudiation. If a zero knowledge proof is included as part of a query result package payload, then the digital signature 138 may also indicate that the zero knowledge proof has not been tampered with during transit, e.g. across the one or more networks 120.

FIG. 1C shows a second view 150 of the distributed computing system of FIG. 1A. The second view 150 illustrates how content relating to the query data 132 may be obtained as a subsequent operation. The example of FIG. 1C is not considered limiting; in other cases, the content may be provided as part of the query data 132 (e.g. and may only be accessible on a successful match) and/or downloadable from another computing device.

In the example of FIG. 1C, the messaging service 110 has access to content 140. For example, the content 140 may be supplied together with the original query data 132 and may be stored in a storage device that is accessible to the messaging service 110. The content may be encrypted, encoded, and/or compressed as desired. As described above, the content may comprise any digital data, including commands to be performed by the computing entities 130 and binary executables, as well as text, image, video and/or audio data. In the example of FIG. 1C, the messaging service 110 is configured to make the content available over the one or more networks 120 to the computing entities that match the defined query, in the present case: the second computing entity 130-B, as indicated by the download of content 140-B. It should be noted that in certain cases, the content 140 may be referred to as a payload, e.g. the content data 144 may be seen as a payload of the message of FIG. 1D or of a separate query data message. In one case, the query data 132 of FIG. 1B and the message 140 of FIG. 1D may be combined into a single message. In a distributed ledger example, content may be available by providing a secure link within a block of the distributed ledger, where the block is addressed to the identifiers of the matching computing entities.

In one case, the messaging service 110 may collate query result packages 134 for one or more computing entities, verify that the query result packages 134 have been generated by matching computing entities (e.g., verifying the digital signature), and then add the identifiers 136 from verified packages to an address list for distribution of the content 140. The address list may use the identifiers 136 as addresses for distribution of the content 140. The content 140 may be transmitted to addresses on the address list and/or the address list may be used to determine whether computing entities that request the content 140 are allowed to download the content (e.g., may be used as an access list).

In FIG. 1C, the dashed line indicates that following transmission of the query result package 134, the second computing entity 130-B may send a request for the content to the messaging service 110 over the one or more networks 120. The request may be digitally signed using the private key of the private-public key pair for the query. The messaging service 110 may receive the request and authenticate that the request relates to identifier 136 by verifying the digital signature associated with the request using the identifier for the computing entity and the query. If the request is authenticated, and the identifier 136 is present on the address list at the messaging service 110, the messaging service 110 may respond by transmitting the content 140 to the second computing entity 130-B as shown. In other cases, for example if the content has been downloaded with the query data 132, an explicit request for content may not be required, e.g. the computing entity may access a node of a distributed ledger and/or distributed file system that forms part of the messaging service 110 to download the content.

FIG. 1D shows an example of the form of the content 140. In this example, the content 140 is packaged as a message to be accessed by the matching subset of computing entities (e.g., in a pull or push context as described above). The message is addressed to the set of matching identifiers—i.e. the list of identifiers 142 comprises the identifier 136 from FIG. 1B. The message also comprises content data, which in FIG. 1D is shown as binary data 144. The message may also have metadata similar to the query data 132. In the present case, the message has a "Created" field and a time-to-live (TTL) field, which again provides constraints on when the content may be used. The content 140 may have different constraints to the query data 132 (e.g., may have a longer TTL or a different created data or different application constraints).

FIGS. 1A to 1D show an example process whereby a multi-directional zero-knowledge attestation is used to securely and selectively supply content to a set of computing devices that form part of a distributed computing system. This may be thought of as a query-response protocol whereby a query is broadcast to the set of computing devices and then distributed nodes in the system respond based on a (local) execution of the query. The set of computing devices may "self-select" different queries, e.g. have a choice of whether to execute a query that is published as query data 132 by the messaging service 110. In one case, configuration data within the query data 132 (the "properties" in the Figure) may be used for this "self-selection". This may enhance security as a snooping party may not be able to determine whether a computing entity does not respond because it does not match the query or just because it selects not to execute the query. The "self-selection" may interface with a set of constraints or preferences set out in the configuration data. Responses are generated as query result packages 134 in the examples by computing entities self-selecting queries and processing them locally. In addition to answering the query, computing entities include proofs of computation and integrity as well a use-limited or ephemeral identifier. These enable third parties, such as the messaging service 110 and/or the creator of the query, to determine response integrity and establish subsequent communication for follow on queries or payload execution.

Actuating Content

Figure 2:
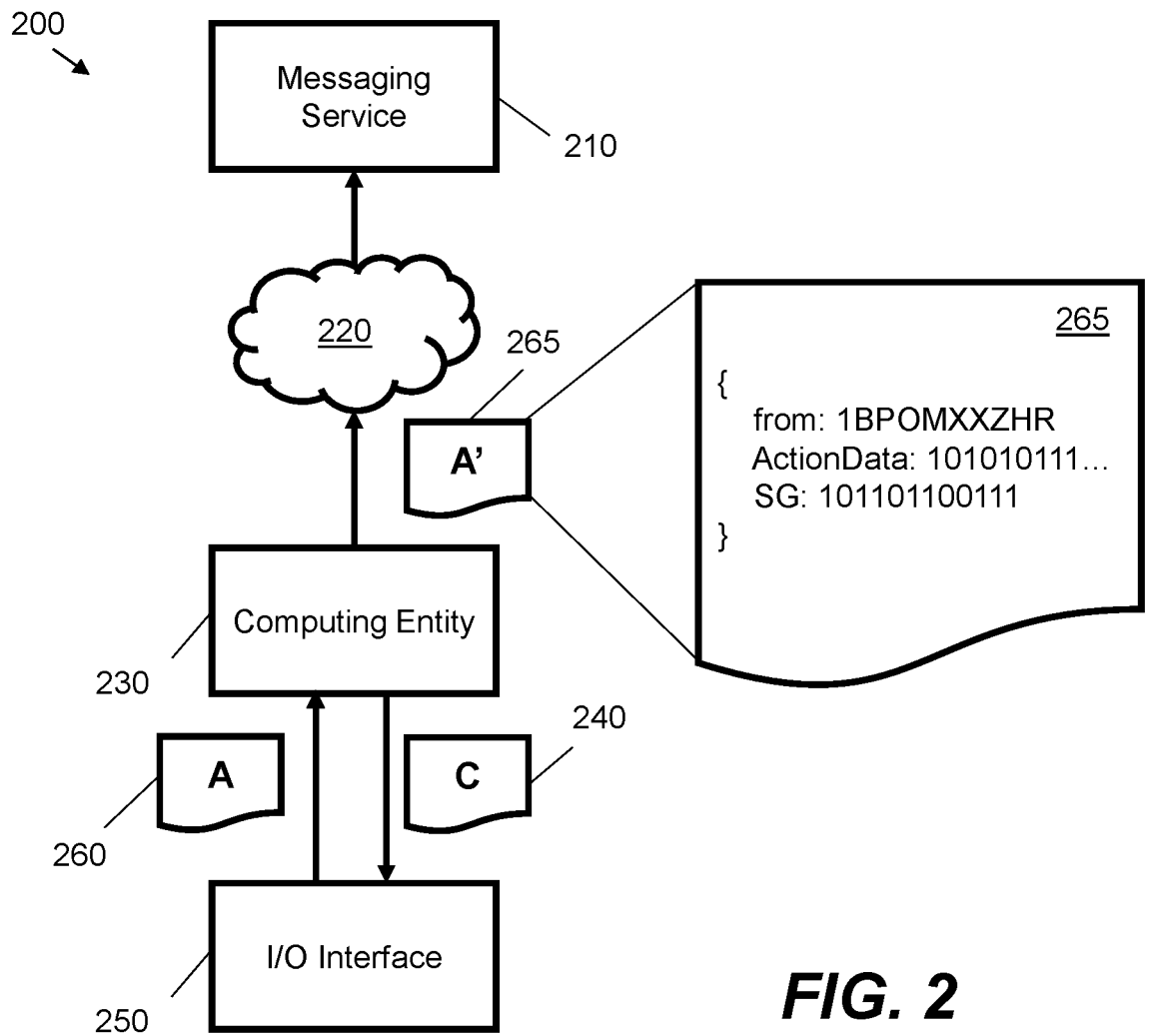
FIG. 2 is a schematic illustration showing an action response generated by a computing entity according to an example.

In certain examples, the content or payload associated with a query may be actionable in some manner. For example, actuating content may comprise, amongst others: rendering the content on a display screen in the case of text, image or video data; executing executable computer program code and/or a received command; and playing audio data. The actuation of content may occur at a time after receipt of the content and may occur in response to an action performed in relation to the computing entity. For example, if the computing entity comprises a mobile computing device, the action may be a user of the computing entity accessing an application, clicking on a message in a message queue or entering a geo-fence. FIG. 2 shows an example process 200 whereby an action is performed.

For simplicity, FIG. 2 shows a messaging service 210, one or more networks 220 and a single computing entity 230. These components may comprise the messaging service 110, the one or more networks 120 and the second computing entity 130-B of the previous examples. In FIG. 2, an input/output (I/O) interface 250 is shown that may be used to actuate content 240, which may be the content 140 from FIG. 1D. The I/O interface 250 may form part of the computing entity 230 (e.g., comprise an integrated display device) and/or may be a separate device (e.g., a separate television or voice assistant). In the example of FIG. 2, the I/O interface 250 receives the content 240 for actuation. This may comprise displaying the content 240, executing the content 240 or playing the content 240. In FIG. 2, the I/O interface 250 also receives an input that relates to the actuation of the content 240. This is communicated as action 260 to the computing entity 230. This may comprise, for example: receiving an input from a touchscreen interface; receiving a voice command from a voice assistant; moving to a particular location; typing a message on a keyboard; determining whether a particular time has elapsed etc. In the present example, the action 260 may be associated with the query defined by the query data 132 as described in the previous examples. In FIG. 2, the computing entity 230 is configured to process the action 260 and prepare an action message 265 for upload to the messaging service 210. Although the messaging service 210 is an example recipient, in other implementations a different third party may receive the action message 265. The action message 265 forms a further communication in relation to the query, e.g. in addition to the query result package 134 of FIG. 1A and the content request of FIG. 1D. In a distributed ledger implementation, the action message 265 may be appended to a block to be included in the ledger.

In FIG. 2, the action message 265 comprises a from field that provides the identifier 136 shown in FIG. 1B and provides optional data relating to the action (shown as "ActionData"). The action message 265 may be digitally signed as per the query result package 134 in FIG. 1B, e.g. as shown by the digital signature SG in FIG. 2. As the action message 265 is digitally signed using the private key of the private-public key pair for the query, the action message 265 is able to indicate that the action 260 was performed by a computing entity that had a successful match for the query defined by the query data. The private key of the private-public key pair for the query is thus used to digitally sign the action message 265, which is a communication relating to the query, and the action message 265 may be (later) authenticated using the corresponding public key (e.g., by the messaging service 210).

The example of FIG. 2 shows the use of the same use-limited private-public key pair for further communications relating to the query. As an alternative, it is also possible to use a second zero knowledge attestation to provide authentication. This may be performed by matching a further query, where the query effectively asks: "was the computing entity a successful match for the first query?" (e.g., individually or in combination with other expressions). In this case, within the secured execution space for the computing entity, this further query may be matched against private data for the computing entity in a similar manner to the first query. The further query comprises at least a determination of whether the query defined by the query data was a successful match. A further use-limited private-public key pair for the further query may thus be obtained for the further query and a further identifier for the computing entity may be generated using the public key of the further use-limited private-public key pair. The action message 265 may thus be prepared as a further query result package based on the successful match for the further query, the further query result package comprising the generated further identifier and the further query result package acting as a zero knowledge attestation for at least the question of "was the computing entity a successful match for the first query?". In this case, the identifier in the action message 265 comprises a different identifier to the identifier 136 used in the query result package 134 and the digital signature is generated using the further private key rather than the original private key for the first query. In this case, the further query result package indicates that the action was performed by a computing entity that had a successful match for the query defined by the query data. This alternative thus has the same effect as the example of FIG. 2 but allows a second identifier to be used instead of the first identifier to provide an additional layer of security.

In certain cases, a computing entity may deem it suitable to refer to a set of aggregate queries using a common identifier based on the public key of the use-limited private-public key pair. For example, an initial query may request information relating to particular attendees of a ticketed event in a particular location. The content for the query may comprise a one or two-dimensional barcode to allow access to a private location, and an action message may comprise a response to indicate that the barcode has been successfully used for access. In this case, e.g. at a later point in time, a query creator may wish to submit a further query associated with the initial query. For example, this may be a query such as: "successfully used the barcode AND attended via motor vehicle", e.g. for use in sending a video indicating public transport options for a future event in the same location. In this case, computing entities may respond to the further query using the same public identifier as the initial query, as the further query is related to the initial query. In this case, the initial query and the further query form a query set.

In certain examples, a query result package and/or further communications may comprise a proof-of-work, e.g. as proof that a particular set of computations were performed. This may be provided as an additional element of security, e.g. to make it computationally hard for a malicious party to fake or modify old messages or events in the system. In one case, the proof-of-work may be chained to previously broadcast messages, e.g. in a distributed ledger that implements a blockchain. This may create a blockchain that is weaved throughout a set of broadcast messages to help ensure integrity of the system.

Example Query Generator

Figure 3:
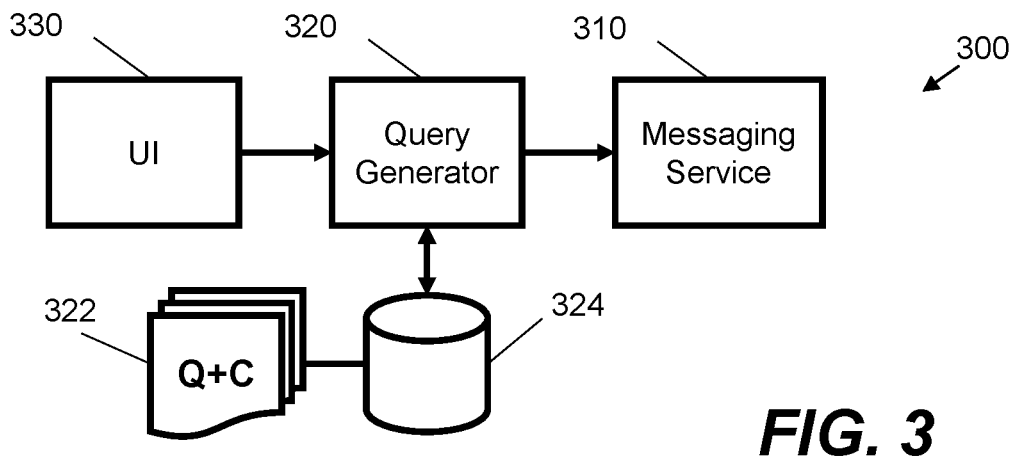
FIG. 3 is a schematic illustration showing a system for the generation of query data according to an example.

FIG. 3 shows an example set of components 300 that may be used to define one or more of the query data and content from the previous examples. The set of components 300 comprise a messaging service 310, a query generator 320 and a user interface 330. The messaging service 310 may comprise one or more of the messaging services 110 and 210 of the previous examples. In this case, a query creator may use the user interface 330 to interact with the query generator 320 and define the query that is to be executed by the set of computing entities. The query generator 320 may also define a query set, e.g. query-by-query, as a complete query set, and/or based on subsets of queries. This may comprise defining the query itself as well as associated metadata for the query. The query creator 320 may be authenticated in certain cases. The query creator 320 may also provide a public key for use in encrypting communications relating to a particular query and/or encrypting a symmetric key used to encrypt communications. In FIG. 2, the query generator 320 receives choices from the query creator via the user interface 330 and generates query data 322 that is stored in a storage device 324. The query creator may also supply content via the user interface 330 (and/or via other methods) which may also be stored with the query data 322 within the storage device 324. In use, the messaging service 310 may access the query data 322 and publish it for access as query data 132 by the set of computing entities 130 as shown in FIG. 1A. The messaging service 310 may also retrieve content from the storage device 322 for download by a subset of the computing entities 130 as shown in FIG. 1C. The query generator 320, user interface 330 and/or messaging service 310 may be implemented as processes that are executed on a common (i.e. shared) server computing device or on different server computing devices.

In examples described herein, the zero knowledge approach has two benefits. On the computing entity side, a zero knowledge attestation forms part of the strategy for preventing data leakage. For query creators, e.g. those interacting with the query generator 320, they provide assurances that a match was computed correctly by the computing entities in the response set. Without these two benefits, query creators would have weak assurances that computing entities are correctly matching data and computing entities would have no assurance that their private data is not leaking.

In the above examples, a query result package acts as a zero knowledge attestation. This may be performed in a number of different ways. In a simple case, a public key of a private-public key pair is used as an identifier and the query result package has an associated digital signature that is generated using the corresponding private key. In more complex case, the query result package may comprise a public key identifier, a digital signature and a zero knowledge mathematical proof. The zero knowledge mathematical proof may comprise a zero-knowledge succinct non-interactive argument of knowledge (a so-called ZK-SNARK) or a so-called bullet proof. The zero knowledge mathematical proof may comprise the result of a ZK-SNARK computation. The computation may be performed by available ZK-SNARK computation libraries. In this case, when a computing entity broadcasts the query result package, a query creator may access the query result package (e.g., via the messaging service 310, query generator 320 and/or other components of FIG. 3). The query creator may thus mathematically confirm that the query match was computed correctly (e.g., it may be ensured mathematically that the right inputs were provided to produce the desired output).

Zero knowledge proofs, e.g. for inclusion in the query result package, may be interactive or non-interactive. In a non-interactive case, no further information is required from the computing entity to validate the proof, everything needed to validate the proof is publicly accessible. In an interactive case, a challenge-response exchange may be implemented. In this case, a query creator (e.g., via the messaging service 310 and/or query generator 320) may communicate with the computing entity over a privacy respecting channel.

As described above, to improve security against malicious responses, the query response package may also comprise a proof-of-work and/or use a commit-reveal scheme. When a proof-of-work is used, the computing entity may generate a value that produces specific properties when hashed with a payload, such as a certain number of leading zeroes. This may avoid large-scale exploit of the proposed system (as it would be difficult to efficiently generate multiple proof-of-work values for every payload). When using a commit-reveal scheme as discussed above, an attribute may be hashed (e.g., hash=SHA(salt+attribute_value+a public key) and published. The hash may also be published to a blockchain notarize its existence at a moment in time. At a later point in time (e.g. 6 months later), a query creator may wish to validate and/or challenge a claim to the attribute value being made by a computing entity. In this case, a trusted arbitrating entity or device may be given a restricted view of the desired attribute value, a set of query result packages that relate to the attribute value, and the preimage of the notarized hash. The arbitrating entity or device may then validate the packages and attest that they are correct to the query creator, wherein the query creator does not have access to the attribute value.

In general, multiple approaches may be used to configure a query result package that independently or in aggregate form a zero knowledge attestation or element. That zero knowledge attestation or element provides guarantees for both the computing entity and the query creator.

Example Computing Device and Computing Entity

Figure 4:
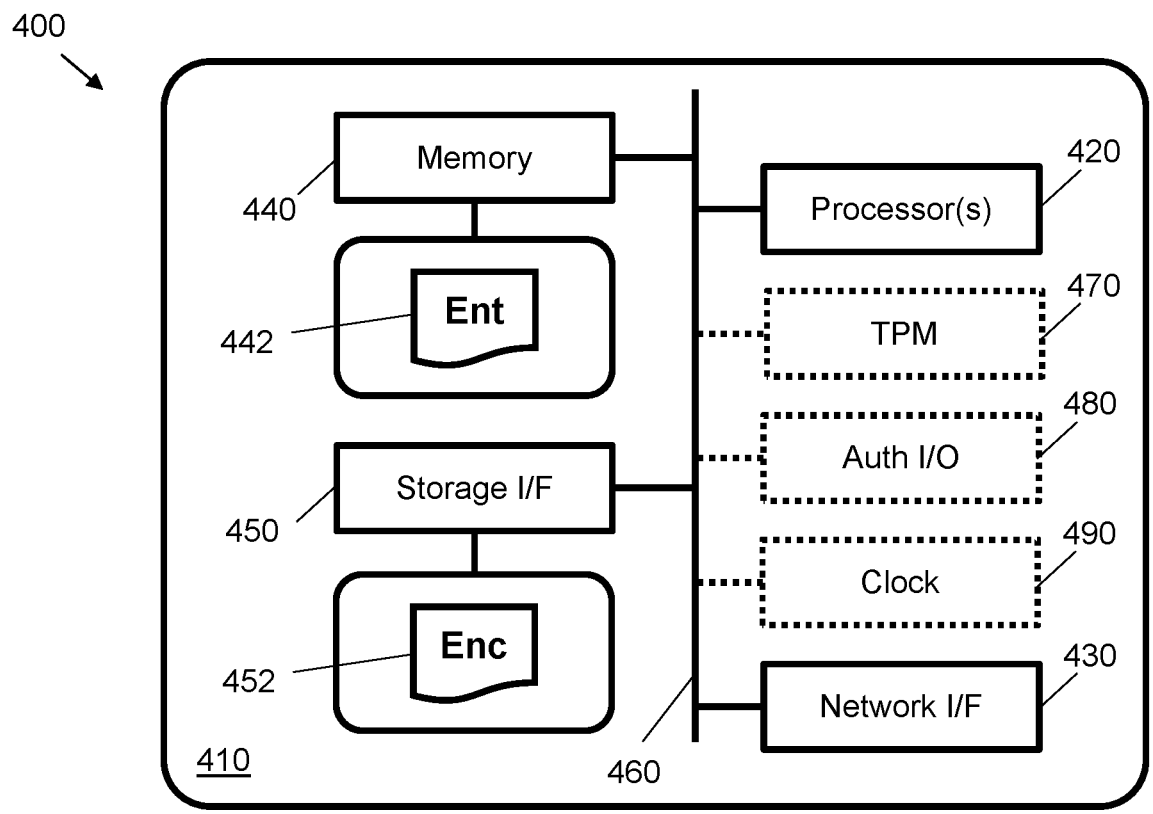
FIG. 4 is a schematic illustration showing a computing device according to an example.

FIG. 4 shows an example 400 of a computing device 410 for implementing a computing entity. For example, the computing device 410 may comprise a client or server computing device that implements one or more computing entities. The computing device 410 may implement the computing entities described with reference to other examples. As some non-exhaustive examples, the computing device 410 may comprise: an embedded sensor device, a mobile phone, a smart phone, a tablet, a laptop, a desktop computer, or a server computing device, including a server computing device hosting one or more virtualised operating system instances.

In the example 400 of FIG. 4, the computing device 410 comprises at least one processor 420, a network interface 430, a memory 440 and a data storage interface 450. In the computing device 410 these components are communicatively coupled via a systems bus 460. The at least one processor 420 may comprise one or more central processing units (CPUs) having one or more processing cores. The at least one processor 420 may comprise an embedded processor in certain cases. In certain examples, the computing device 410 may also comprise other co-processors such as cryptographic co-processors and graphical processing units (GPUs). The network interface 430 may comprise a wired and/or wireless interface for communication over one or more networks, such as the one or more networks 120 and 220 in FIGS. 1A, 1D and 2. The network interface 430 may comprise a wired interface (e.g. an Ethernet connection), a local wireless interface (e.g. Bluetooth®), a wireless local area networking interface (e.g., LAN Wi-Fi) and/or a wireless telecommunications interface (e.g., for communicating over digital cellular networks such as those based on 3G, Long-Term Evolution—LTE—and so-called 5G New Radio standards). The memory 440 may comprise one or more of volatile and non-volatile memory that stores computer program code for execution by the at least one processor 420. In the present example, the memory 440 stores computer program code 442 that implements the computing entity when executed by the at least one processor 420. The data storage interface 450 is configured for communication with one or more storage devices. These may include local storage devices such as hard disks and solid-state drives, as well as remote storage devices, such as those provided by cloud storage providers. Remote storage may, in certain examples, be provided by a distributed file system. It is known in the art that remote storage devices may be configured via the data storage interface 450 (and, in certain cases, an operating system or kernel driver) to appear as a local storage device.

In FIG. 4, the one or more storage devices store private data 452 for the computing entity. In one case, the private data 452 may form part of the computer program code 442 for the computing entity, e.g. may comprise a "state" for the computing entity. In this case, the computer program code 442 (and any configuration data) may be securely stored in non-volatile memory via the data storage interface 450 and then loaded into memory 440 during implementation of the computing entity (e.g., in a similar manner to operating system and/or kernel computer program code). In one case, the computing entity may be referred to as a "vault", i.e. a secure computing agent. The computer program code 442 for the computing entity and/or the private data 452 may be encrypted when stored on a data storage device. In one case, the computer program code 442 may comprise generic computing program code for a plurality of computing entities that is used to instantiate a particular computing entity using the private data 452. Only an authorised user of the computer device 410 may have access to decryption keys for the computing entity and/or the private data. If the private data 452 is stored on a remote storage device via the data storage interface 452, the remote storage device may not have access to the decryption keys for the private data 452, and as such is unable to decrypt and access the private data 452. In other cases, the private data 452 need not be encrypted, but access is controlled via one or more of the data storage interface 450 and the at least one processor 420 (e.g., private data 452 may only be loaded into a secured portion of memory 440 that is inaccessible to unauthorised application processes). In practice a combination of approaches may be used, e.g. private data 452 may be encrypted and access restricted and controlled.

In certain examples, there may be a one-to-one mapping between computing entities and users. In this case, for a multi-user computer device 410, there may be multiple computing entities corresponding to different users on a single computing device (e.g., similar to a multi-user operating system). In this case, one or more of the computer program code for a computing entity and the private data associated with a particular user may be inaccessible to a different user of the same device (e.g., much as a secured file system for one operating system user may be inaccessible to another operating system user).

The example 400 of FIG. 4 also shows a number of optional components that may be present in a computing device such as a mobile computing device, laptop, desktop and/or server computing device. In FIG. 4, the computing device 410 further comprises a trusted platform module (TPM) 470 for cryptographic operations, an authentication input/output (I/O) device 480 and a hardware clock 490. The TPM 470 may be coupled to a motherboard of the computing device 410. The computing entity may use the TPM 470 to perform one or more cryptographic functions, such as encryption, decryption, key generation, digital signature generation and verification, and key storage. It may also be used to store assets (e.g. cryptographic data) from an authority, e.g. a state authority may verify an identity against state records and provide a signing key that may be stored within the TPM 470 to sign identity attestations to be included in query result packages. The TPM 470 may also be used to encrypt and decrypt the computer program code for the computing entity 442 and/or the private data 452. The TPM 470 may be used to provide a secured execution space for the execution of the query as described above. The TPM 470 may store keys and certificates for digital signatures. The authentication I/O device 480 may comprise an integrated and/or external device to authenticate a user of the computing entity. The authentication I/O device 480 may comprise one or more of: a smart card interface, one or more facial recognition cameras, an iris scanner, a fingerprint scanner, and a Personal Identification Number (PIN) terminal. The authentication I/O device 480 may be used to authenticate a user and allow the decryption of the computer program code 442 for the computing entity and/or access to the private data 452. For example, in one case, a user may need to authenticate and approve use of the private data 452 to respond to a query (despite no data from the private data being transmitted in response to the query); for example, a user may approve the use of location or heart rate data for use in performing queries and generating a zero knowledge attestation as described herein. The clock 490 may be used to generate and/or compare timestamps and other time information. For example, a time-to-live may be compared against a time from the clock 490 of the computing device 410 or the clock 490 may be used in association with GPS data.

In one example, the computer program code 442 comprises instructions that cause the at least one processor 420 to perform the steps described herein. For example, the at least one processor 420 may be instructed to: obtain, via the network interface 430, query data (e.g., from a messaging service or elsewhere); within a secured execution space for the computing entity, match a query defined by the query data against the private data 452 accessible via the data storage interface 450; obtain, for the computing entity, a use-limited private-public key pair for the query (e.g., this may be performed using the TPM 470); generate an identifier for the computing entity using the public key of the use-limited private-public key pair; generate a query result package based on a match for the query, the query result package comprising the generated identifier, the query result package acting as a zero knowledge attestation; and provide, via the network interface 430, the query result package to a remote device (such as the messaging service or another computing device). In this case, the computing device 410 is configured to obtain content for the computing entity addressed to the identifier, and the private key of the private-public key pair is used to authenticate communications from the computing entity that relate to the query.

Figure 5:
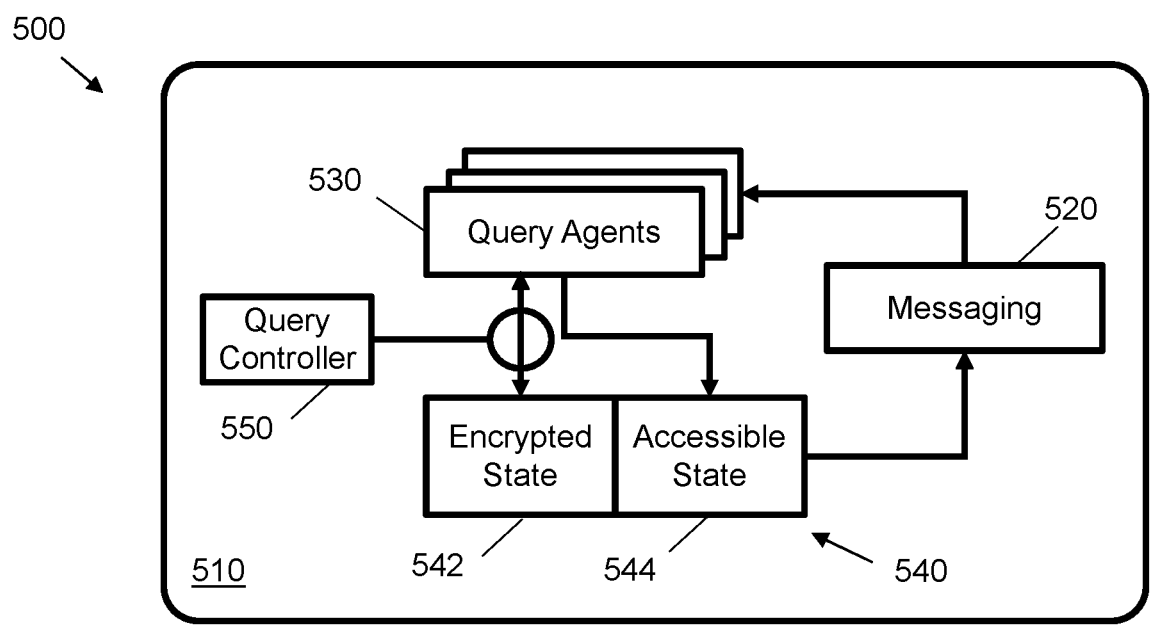
FIG. 5 is a schematic illustration showing a computing entity according to an example.

FIG. 5 shows one implementation 500 of a computing entity 510 as implemented on the computing device 410 of FIG. 4. Other implementations are possible, including those of later FIGS. 7, 11 and 12. In the implementation 500, the computing entity 510 comprises a messaging component 520, a set of query agents 530, a state 540 for the computing entity 510 and a query controller 550. The messaging component 520 may comprise a messaging interface that is configured to communicate with the messaging service of the other examples (e.g., 110 or 210 in FIGS. 1A, 1C and 2). The messaging component 520 may obtain (i.e. retrieve) query data (e.g., 132 in FIG. 1A or 1B) via the network interface 430 of FIG. 4 and may also provide a query result package (e.g., 134 in FIG. 1A or 1B). The query result package may be transmitted to a computing device and/or stored as data within a distributed storage system, e.g. within storage on a different computing device. The messaging component 520 may also be responsible for content or payload download. The set of query agents 530 may comprise a plurality of query agents that are registered with the computing entity 510. Although a single query agent may be used in other examples, in the present case, each query agent may be associated with a different type of query, a different third party query creator, a different set of private data and/or a different data generating device or data source (e.g., a GPS module for location data vs an accelerometer for movement data). In certain examples, query data may be addressed to a specific query agent. This configuration thus allows for extendible query management, e.g. functionality of the computing entity may be extended by adding further query agents and unwanted or undesired query agents may be removed. This may also allow for query agents to be provided by third parties for use in querying private data.

In the example 500 of FIG. 5, the private data of the previous examples is formatted as the state 540 of the computing entity 510. This may comprise encrypted data and/or data that is only accessible to processes that are on a secure access list. In the example of FIG. 5, the state 540 comprises an encrypted portion 542 and an accessible portion 544. Access to the encrypted portion 542 is secured and restricted using the query controller 550. The query agents 530 may thus not have full access to the encrypted portion 542. The accessible portion 544 may be accessible to the query agents but may not contain portions of the private data. For example, if each query is constructed as a Boolean expression, the Boolean output of the query may be written to (and/or read from) the accessible portion 544 but the data used for the evaluation of the Boolean expression is not present within the accessible portion 544 and is only present in the encrypted (or inaccessible) portion 542. In certain cases, particular query agents may have access to defined portions of the private data, and this access is restricted and monitored by the query controller 550.

In one case, the query controller 550 may control the access of the query agents 530 to the encrypted portion of the state 542 by controlling receipt of Boolean expressions in a standardised format from the query agents 530 that may be evaluated against the encrypted portion 542 and only allowing the Boolean result of the evaluation or the result of a zero knowledge proof computation to be returned to the query agents 530. In certain examples, e.g. for strict security, the query agents 530 may not even have access to private data in the encrypted portion 542 but may receive a result of the query that does not give away any values of the private data. The query agents 530 may write a result of the query to the accessible portion 544 of the state 540. This may then be accessible to the messaging component 520 for use in generating a query result package for upload in response to the query data. In this manner, security is provided by the query controller 550. In other cases, the query agents 530 may have narrow access to particular data items within the encrypted portion 542 and the query controller 550 secures this access to ensure that no element of the private data is transmitted outside of the computing entity 510. The query controller 550 may also provide additional functions such as checking that a particular query agent is allowed to perform a query on particular data within the encrypted portion 542, and preventing access if the query agent is removed or de-authorised by a user of the computing entity 510. For example, a query agent may receive a filtered version of a state of the computing entity, where access is only provided to filtered portions of the state (e.g. as defined in configuration data for the query agent). Query agents 530 may also be run in a sandboxed execution environment to provide further security. The query controller 550 may also provide functionality such as managing a queue of Boolean expressions to be evaluated from different query agents 530 and making sure that queries are evaluated within resource limits (e.g., CPU and memory usage limits).

Example Sequence Diagram

Figure 6:
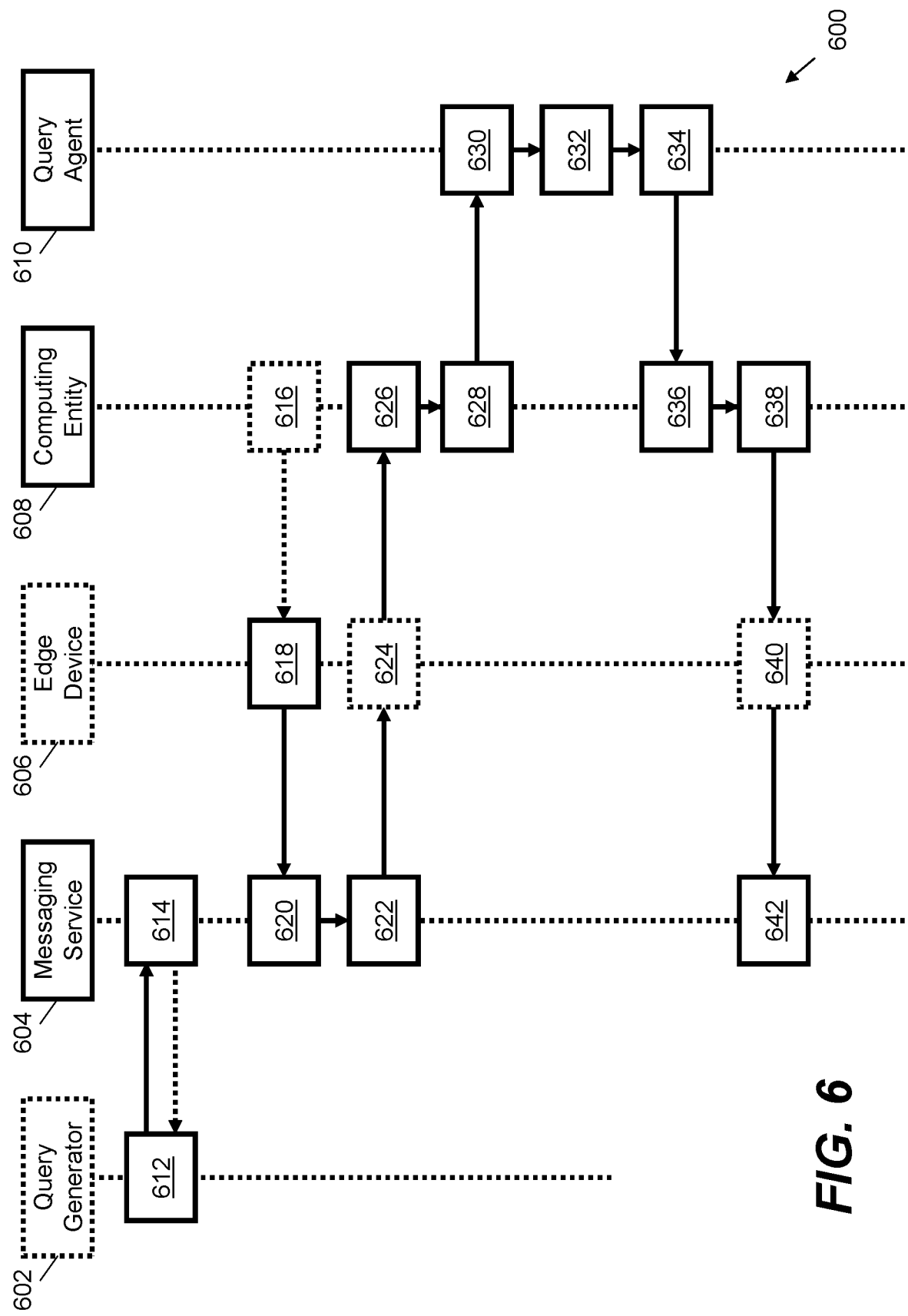
FIG. 6 is a sequence diagram showing communications between a messaging service and a computing entity according to an example.

FIG. 6 provides an example 600 of communications between different components of a distributed computing system. In the example, communications between a query generator 602, a messaging service 604, an edge device 606, a computing entity 608 and a query agent 610 are shown. The query generator 602 and the edge device 606 may be omitted in certain examples. The query generator 602 may comprise an implementation of the query generator 320 in FIG. 3. The computing entity 608 may comprise an implementation of one of the computing entities 130 in FIGS. 1A and 1C, computing entity 230 in FIG. 2 or computing entity 510 in FIG. 5 (as well as other examples). The edge device 606 may comprise a computing device such as 410 in FIG. 4 or another component that implements one or more computing entities (e.g., a server computing device). The query agent 610 may comprise one of the query agents 530 shown in FIG. 5 or another query evaluation component for the computing entity 608.

At block 612, the query generator 602 publishes a query. This may comprise a process similar to that shown in FIG. 3. The query generator 602 may publish a query by making query data available to the messaging service 604, e.g. via transmitting a message to the messaging service 604 that comprises the query data or a link to allow access to said data (e.g., a link to data 322 in storage device 324), or via the messaging service 604 polling the query generator 602 for new queries (e.g., as shown by the dashed arrow to block 612). At block 614, the messaging service 604 prepares the query data for broadcast to a set of computing entities. For example, this may be performed as explained with reference to FIG. 1A. In certain cases, it may comprise making query data available for download, e.g. adding an "addressed to all" block to a distributed ledger with the query data and/or a link to the query data. Query data may also be addressed using previously provided public identifiers, e.g. those derived from public keys received with regard to earlier communications. In certain cases, the messaging service 604 may group query data according to the query agent that is associated with the query; in this case, the query agent may be indicated in the query data, such as in the form of a query constraint as explained with reference to FIG. 1A. The query data is then made available for download by the set of computing entities. Use of query constraints may allow examples to scale. For example, sets of queries may be partitioned by geographic location, and so computing entities that process a geo-specific query may only check a query group associated with their particular geographic location.

At blocks 616 and 618 one or more of the computing entity 608 and the edge device 606 make a request to the messaging service 606 for query data that is addressed to the computing entity 608. Although a "pull" example is shown in FIG. 6, in other examples, this process may comprise a "push" request from the messaging service 604 to one or more of the computing entity 608 and the edge device 606. Having a "pull" based system may improve security by enabling anonymous retrieval of data from the messaging service 604. In certain cases, additional security may be provided to obfuscate and/or otherwise conceal requests made at block 620 from an edge device 606 and/or computing entity 608. For example, the messaging service 604 may be a distributed service wherein multiple nodes may comprise a synchronised copy of one or more message sets. In this case, the edge devices 606 and/or computing entities 604 may only communicate with a more secure node over a LAN (e.g. within a more secure "ring" as discussed later below), such that a node of the messaging service 604 on a WAN does not receive request information such as computing device IP addresses and the like (it only sees an IP address of the LAN on the WAN). This may make it difficult for malicious parties to track past query data downloads and query result package responses.

In FIG. 6, at block 618, the edge device 618 accesses the query data provided by the messaging service 606 at block 620. For example, this may be retrieved over one or more networks including wireless telecommunications networks. In one case, the edge device 618 may request all unread messages for all devices or relating to a particular identifier, e.g. since a stored last request timestamp. At block 622, the edge device 606 and then the computing entity 608 retrieve the query data from the messaging service 604. Optional edge processing may be performed at block 624 by the edge device 606 prior to receipt by the computing entity 608 at block 626. For example, the edge device 606 may abstract some of the messaging protocol from the computing entity 608. At block 624, the edge device 606 may also activate or re-activate the computing entity 608. For example, when it is not used the computing entity 608 may be placed in a sleep state whereby computer program code and/or private (state) data for the computing entity 608 is encrypted and stored in non-volatile storage. At block 624, the edge device 606 may retrieve one or more of the computer program code for the computing entity 608 and the private data (e.g., data 442 and 452 in FIG. 4), decrypt this and load the required data into memory to activate (i.e. execute) the computing entity 608.

At block 628, the computing entity 608 processes the received query data. This may comprise query data associated with a plurality of queries. In one case, the computing entity 608 may queue the query data, e.g. according to a created date and/or assigned priority. At block 628, the computing entity 608 identifies the query agent that is to be used to evaluate a given query (i.e. a given set of query data such as 132 in FIG. 1A). In FIG. 6, the query agent is selected as query agent 610, and the appropriate query data is forwarded to this query agent 610 at block 630. One or more of blocks 616, 626 and 628 may be performed by the messaging component 520 of FIG. 5.

At block 632, the query agent 610 evaluates the query against private data for the computing entity 608. In one case, the query agent 610 may be configured to securely access this data; in another case, it may prepare a Boolean expression for evaluation by a trusted component of the computing entity 608. For example, for a geo-location example such as that shown in FIG. 1A, the query agent 610 may evaluate the query defined by query data 132 against private GPS data for the computing entity 608 to check whether a current and/or historical location of the computing entity 608 falls within the geo-fence defined as part of the query data 132. However, the query agent 610 may not have access to other portions of the private data. In one case, the query agent 610 writes a result of the query to an accessible portion of a state, such as 544 in FIG. 5. At block 634, following evaluation of the query and the generation of a query result (e.g., a Boolean output), control is passed back to the computing entity 608. At block 636, the computing entity 608 may process an output generated using the query agent 610. This may involve checking the query agent 610 has permissions to output a result and write to an accessible portion of a computing entity state (such as 544); if permission is granted, the output of the query may be written to the accessible state 544. A check may also be made that the query agent 610 is not writing any data that is present within the private data. In certain cases, the query agent 610 may be provided with authority to access and/or write to the private data. For example, an authorised machine learning model may be applied to raw data for a computing entity (such as illustrated in the later state of FIG. 8A) and then may write at least one result of processing the raw data to a private portion of a state. In this case, the authorised machine learning model may be allowed write access to at least a particular part of the state, and in certain cases, may create properties and/or attributes that are later queried.

At block 638, the computing entity 608 prepares a query result package (e.g., similar to 134 in FIG. 1A) for upload to the messaging service 604. This may occur immediately after evaluating the query (e.g., as part of a continuous process), at a later point in time (e.g., as part of a batched process using any results that are stored in the accessible state 544), or at random time intervals (e.g., to obscure possible identifying features of the computing entity and which queries it may have processed). In one case, at block 640, the edge device 606 may receive one or more query result packages (or data to generate such packages) from the computing entity 608. In this case, the edge device 606 may deactivate the computing entity 608 if it is no longer needed to process queries. For example, as described above, the edge device 606 may place the computing entity 608 into a "sleep" state by encrypting computer program code and/or data stored in volatile memory and storing this in non-volatile memory (e.g., via the data storage interface 450 in FIG. 4). In other cases, the computing entity 608 may remain in an active state at block 640, such that the edge device 606 just uploads one or more query result packages to the messaging service 604 (e.g., via network interface 430 in FIG. 4) where it is received and processed at block 642 (e.g., as explained with reference to FIG. 1A). Within the computing entity 608, one or more of blocks 636 and 638 may be performed by the messaging component 520 shown in FIG. 5.

Example Computing Entity Process Flow

Figure 7:
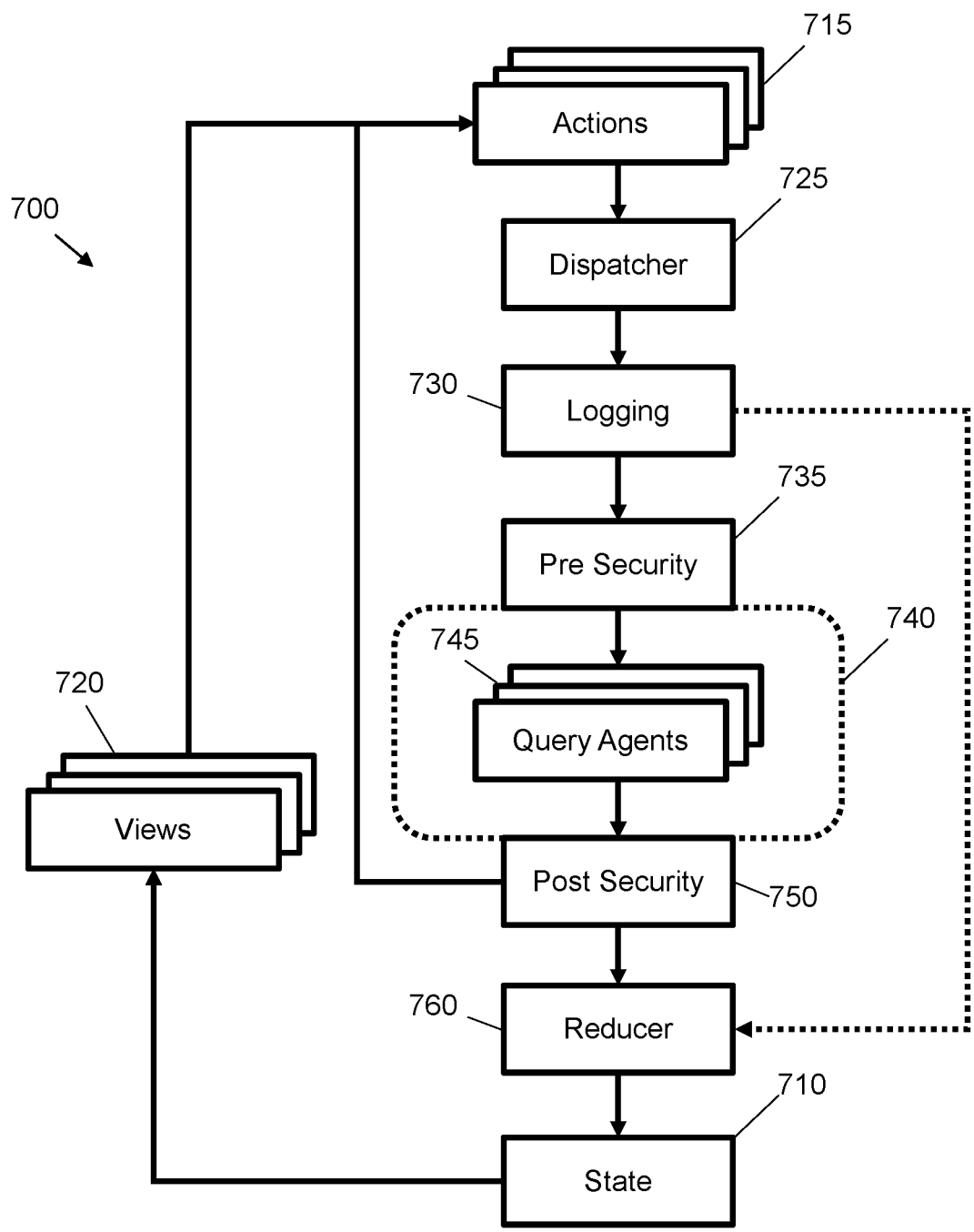
FIG. 7 is a schematic illustration showing a state update process according to an example.

FIG. 7 shows an example of a process flow 700 that may be performed by a computing entity in order to evaluate one or more queries. The process flow 700 may be implemented by any computing entity of the previous examples. The process flow 700 provides a pipeline with a unidirectional dataflow. This facilitates the insertion of components along the pipeline to enforce security measures and/or provide other custom functions. These security measures and custom functions may implement the control of the query controller 550 of FIG. 5. Each portion of the process flow 700 may be implemented by a corresponding computer program code object.

Figure 8A:
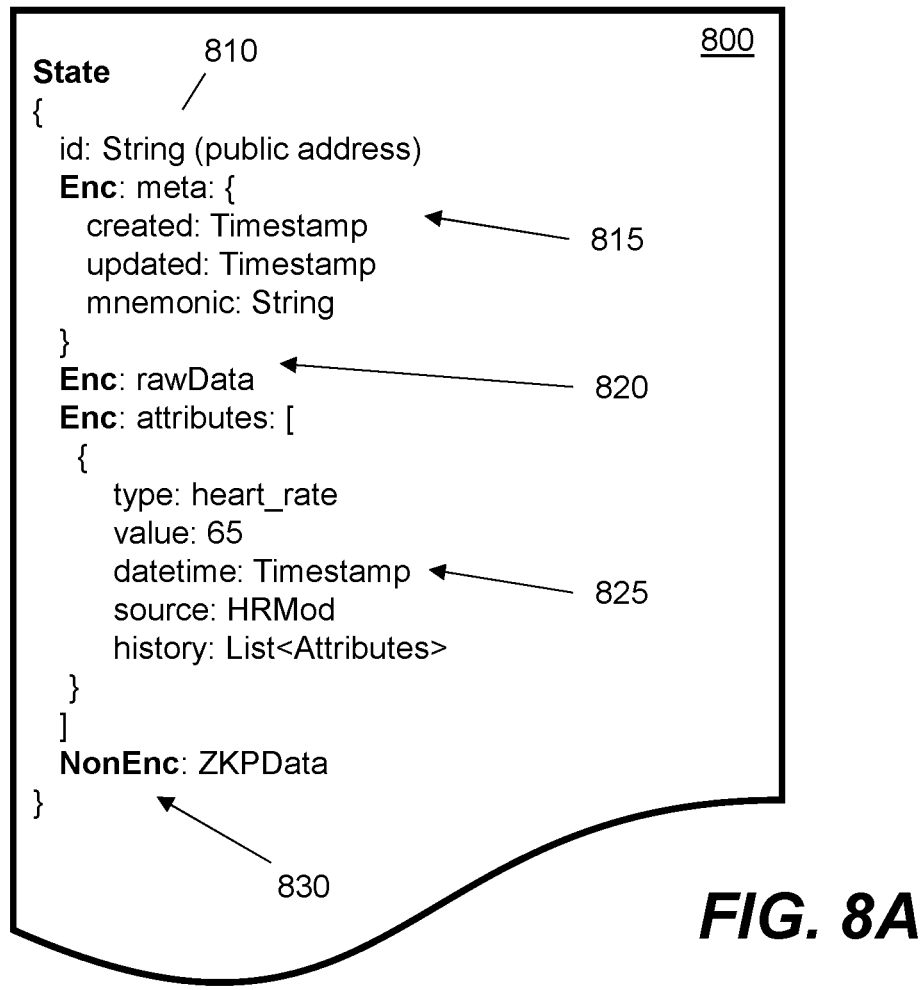
FIGS. 8A and 8B are schematic illustrations respectively showing example state data and example query agent configuration data.

The process flow 700 is based around a state 710 of the computing entity. An example of data that may define such a state is shown in FIG. 8A. The state 710 may further comprise the state 540 as described with reference to FIG. 5. Actual process flows may be more complex that the example of FIG. 7 (e.g. different executions of the process flow may involve different components and/or complex interactions between components whereby one component may call another component which in term may call another and so forth); however, FIG. 7 provides a generalised example that helps explain one way to implement the approaches discussed herein.

The process flow 700 of FIG. 7 executes an action 715 which may eventually update the entities state. A query to be performed may be run as a function that is composed of one or more actions 715. Each action 715 is sequentially processed by the process flow 700 and may have a defined input-output mapping. A function may also make network calls and have non-deterministic behaviour. A function may be implemented using one or more actions 715. In the present example, a query to be performed may be initially run as a function. The function may be implemented by a query agent (e.g. as part of the query agent logic). The actions 715 may be completed in association with one or more views 720 of the state 710. A view 720 may manage access to the state 710. For example, a view 720 may restrict the state data that is readable by an action 715. For example, an action generated by a heart rate query agent may only be able to view heart rate attributes within the state 710, and thus a view 720 may only provide the heart rate attributes to the action (and not provide access to any state data that does not comprise the heart rate attributes—this data may be removed in the view).

In FIG. 7, a dispatcher 725 is configured to receive and manage actions. For example, a query action that is implementing a function to perform a query may generate one or more actions 715 that are received by the dispatcher 725. The dispatcher 725 may manage a queue of actions 715. The dispatcher 725 may be seen as the start of a processing pipeline for an action. The dispatcher 725 may be responsible for ensuring an action is sent to the right component, orders actions, and/or follows a correct route through the pipeline (e.g. going through or skipping certain components).

Following selection and dispatch by the dispatcher 725, an action 715 may be provided to logging component 730. The logging component 730 may comprise a set of one or more initial components to monitor action execution (e.g. either actively or passively). The logging component 730 may help identify unauthorised access. The action is then sent to pre-security check 735. Pre-security check 735 may check the nature of the action (e.g. read and/or writing of a portion of the state 710). The logging component 730 and/or the pre-security check 735 may be considered part of a middleware layer for the process flow 700. The pre-security check 735 may be seen to be the start of a secured execution space 740. The generation of zero knowledge proofs may be performed within the secured execution space 740. This may be a sandboxed space. Within the secured execution space 740, a set of query agents 745 that are associated with the received query data are activated. For example, each action 715 may relate to a different query with different but associated query data. In certain cases, query data may be passed to a particular query agent 745 for evaluation or query agents 745 may be provided with their own isolated storage to maintain internal state (and this may store the query data).

The operations within the secured execution space 740 may depend on which zero knowledge approach is being implemented. In one case, a ZK-SNARK library may be used. In this case, at least a portion of a query agent 745 may comprise computer program code associated with this library and thus the query agent 745 may generate a zero knowledge proof (and/or any of the additional zero knowledge data discussed in examples above) using the library for inclusion in a query result package payload. In another case, a Boolean value representing the outcome of the query may simply be generated. In yet another case, a query agent 745 may be code-signed using a trusted TPM (e.g. TPM 470) and a code-signing module may digitally sign an output of the query agent to indicate that the bytecode was unaltered, it ran correctly, and the result has a specific hash. A combination of these approaches may be used. The secured execution space 740 may be ensured using a variety of measures. In examples, a restricted view of the state 710 as provided by the views 720, checks that a query agent is enabled and/or authorised, and checks that a query agent is running according to defined constraints (e.g. is only accessing data as set out in configuration data for the query agent).

Following the execution of a query agent from the set of query agents 745, a post-security check 750 is performed. This may be a check to ensure correct access to the private data and no leakage of private information. It may ensure the security of the secured execution space 740. As described with reference to FIG. 5, operations with the secured execution space 740 may be controlled via the operation of a query controller 550 that implements the security checks at blocks 735 and 750. The post-security check 750 may check that a request from a query agent 745 is authorised. The request may itself be a further action 715, e.g. as indicated by the arrow from the post-security check 750 to the actions 715. The request may, for example, be for a write to a specific portion of the state 710 and/or a response to be uploaded to a messaging service.

Following post-security check 750, an action 715 may be passed to reducer 760. The reducer 760 is configured to update the state 710 based on the action 715. The reducer 760 may take at least a portion of an old state 710, create a copy, update an attribute or other data value, and then return an updated version of the state 710. In certain cases, as shown by the dotted arrow in FIG. 7, actions 715 may not necessarily go through the query agents 745 and may be passed following the logging component 730 directly the reducer 760 for execution. The reducer 760 (and in certain cases post security checks 750) may be considered "afterware". This "afterware" may also include additional components such as further logging or other components that provide security and/or enhance pipeline functionality.

The underlying processing pipeline and the deterministic nature of actions may facilitate the implementation of the other examples described herein, but the approach of FIG. 7 should not be considered limiting. The unidirectional process flow allows components such as the logging component 730, the security checks 735, 750 and the query agents 745 to be additionally inserted into a pre-existing processing pipeline to implement secure query execution or enhance components as described herein.

In practice, process flows may be more complex than shown in FIG. 7. For example, a query agent may begin processing a function outside of the process flow 700, or be processing at location 745, and then dispatch another action to update the state 710. That action may not pass through the query agents 745 again but may go straight from the logging component 730 to the reducer 760 to update the state 710. The routing of actions may be controlled by the dispatcher 725. For example, when a query agent dispatches an action, the dispatcher 725 may determine a component address for the action, send it through the middleware and then send it on to the appropriate reducer 760 and/or other "afterware".

In the context of query execution, received query data may be handled by a query agent, which may be implemented as a function as described above. The query agent may be provided with a view of the state portions it has access to, as well as the query data (e.g. as extracted from a payload of a message retrieved by the computing entity from a messaging service). The query agent processes the payload and the view to execute the query, e.g. to determine if there is a match. If there is a match, another function and/or action may be initiated to generate a query result package for transmission and/or update the state 710 if required. The function to generate a query result package may send an action that is intercepted by middleware to insert an identifier (e.g., the public key of the private-public key pair for the query), ensure security and/or data access criteria are met, append a zero knowledge proof (if necessary), and/or digitally sign the query result package (or data for the package). When the middleware has completed processing, the query result package may be uploaded to the messaging service, and a further action may be dispatched to log the success or failure of the query execution within the state.

Example State and Configuration Data

FIG. 8A shows an example state 800 for one implementation of a computing entity. In this example, the state comprises data that forms part of the computing entity. The state 800 may be used to implement the state 540 of FIG. 5 and the state 710 of FIG. 7. The state 800 may be used in combination with general computer program code to instantiate a particular computing entity.

The example state 800 of FIG. 8A comprises a number of portions. A first data portion 810 defines an identifier for the computing entity. This may differ from the query-specific identifiers that are used as part of the query responses described herein. In one case, the identifier may comprise a general public key for the computing entity and/or the query service. In another preferred case, it may comprise a private identifier, e.g. that is used by an entity wrapper as explained later below. In this case, the identifier may not be made public. It may be stored as a fixed or variable length alpha-numeric string. In one case, the identifier may comprise the root seed as later described with reference to FIG. 9. In another case, the identifier may comprise a universally unique identifier (UUID). In one case, a computing entity may have no public identifier, such that the "to" field of the query data 132 may only feature either a query-specific identifier based on a public key (as shown as 142 in FIG. 1D) or a "to all entities" entry.

A second data portion 815 defines metadata for one or more of the state and the computing entity. In FIG. 8A, this metadata comprises a date of creation for the computing entity, a date of last update for the state and a mnemonic. Several timestamps may be stored, including additionally a "last run" timestamp that indicates a datetime when the computing entity was last executed. The mnemonic may comprise a string sequence. The mnemonic may be used as part of a key generation process for the private-public key pair that is assigned to a query. The mnemonic may also be used to seed other cryptographic processes. In certain cases, the identifier of the first portion 810 may be derived from the mnemonic; this may allow recovery of a computing entity on provision of the mnemonic as a form of password. An example key generation process is set out later with reference to FIG. 9.

A third portion 820 of the state stores raw data associated with the computing entity. Raw data may represent an area to store raw sensor data and/or other unprocessed data from a computing device. It may, for example, include raw GPS telemetry, raw HTTP header information, raw results from an operating system service call etc. Raw data may be processed by a query agent.

A fourth portion 825 of the state stores specific attributes associated with the computing entity. These may be generated from the raw data stored in the third portion 820 (or elsewhere). They may comprise an output of pre-processing, e.g. of sensor data. Each attribute may be accessible using an attribute name and may comprise machine-readable data setting out properties of the attribute. For example, FIG. 8A shows an example of a heart rate attribute. This example attribute has a type or name ("heart_rate"), an associated value ("65"), a datetime field ("datetime") indicating a time of measurement for the value, a source of the value (in this case a heart rate module—HRMod) and a history, which may comprise a list of past values (e.g., a rolling list of a fixed length). In certain cases, collected raw data and added or modified attributes may be timestamped (e.g., at the time of collection, addition and/or modification). Lastly, a fifth portion 830 of the state is used to store zero knowledge attestations that result from the evaluation of queries ("ZKP-Data"). This may comprise one or more of: Boolean values generated by the evaluation of Boolean expressions defining the query; query-specific identifiers for cases where a positive match is found (e.g., based on a public key of a private-public key pair for the query as described above); zero knowledge proofs generated by zero knowledge libraries; hashes of attributes; and/or proofs-of-work.

In the example state 800, certain portions of the state may be encrypted and certain portions of the state may not need to be encrypted. The second, third and fourth portions of the state—815, 820 and 825—are encrypted in FIG. 8A ("Enc") while the first and fifth portions—810 and 830 (i.e. the public identifier and the ZKPdata) are not encrypted ("Non-Enc"). The encrypted portions may reflect private data that is not to be accessed outside of the computing entity. The non-encrypted portions may be suitable for communication outside of the computing entity (e.g., to local or remote processes) and so need not be encrypted (but may be encrypted if so desired). For example, the public identifier and the zero knowledge attestations (e.g., whether in the form of Boolean values or public keys) provide no information from the private data of the (encrypted) second, third and fourth portions. In certain cases, the ZKPData may comprise a use-limited public key that indicates a positive match to the query of "heart_rate>55?" without providing access to the attribute value of 65.

Figure 8B:
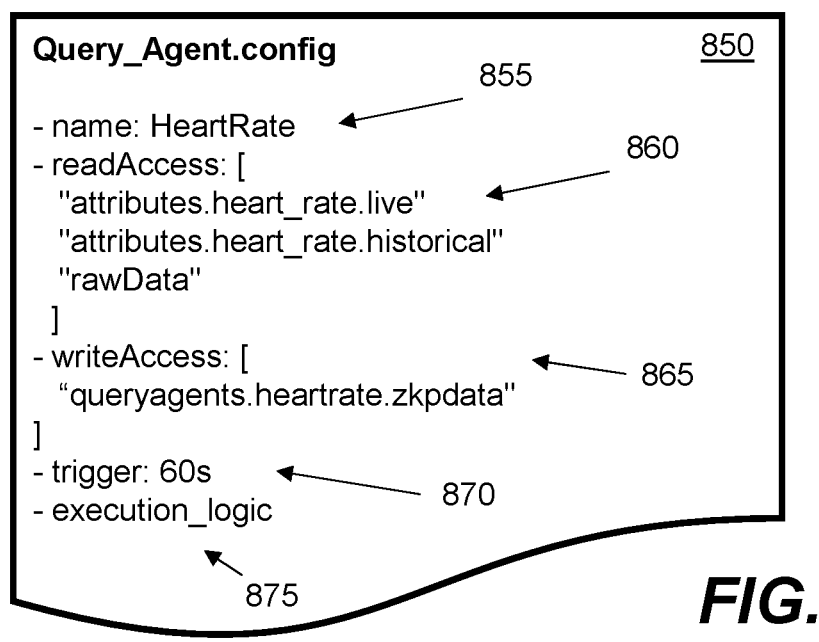

FIG. 8B shows example configuration data 850 for a query agent. In this example, the query agent is one configured to evaluate queries relating to the heart rate of a user. The configuration data 850 defines a query agent name 855 ("HeartRate"), a first set of areas 860 (e.g., portions of the state 800) for which the query agent has read access, a second set of areas 865 (e.g., portions of the state 800) for which the query agent has write access, data 870 defining how often the query agent can access the data (shown as a "trigger" of 60 seconds) and execution logic 875 that may be used to execute the query agent. In this case, the query agent may have access to the encrypted portions of the state 800 but a control process, such as query controller 550 ensures that the query agent is not able to transmit data outside of the computing entity; in this case, a query agent may only write data to the second set of defined areas 865 and the control process may parse these areas to ensure they contain no data from the second to fourth portions of the state 800. In the example of FIG. 8B, the query agent is only able to write to the non-encrypted ZKPdata portion of the state 830. This portion of the state 830 may be checked (e.g., via security check 745 in FIG. 7) to determine that it only contains Boolean values or valid public keys. Only this portion of the state 830 may be used to generate a query result package that is transmitted from the computing entity.

In certain examples, the query matching portion of a query agent may be implemented in a zero-knowledge-proof language or via a zero-knowledge-proof programming library to produce a zero knowledge proof. In certain examples, the query agent may be executed in a sandbox with a restricted or limited set of useable commands and/or programming libraries. For example, a query agent may be restricted from accessing certain cryptographic functions directly to avoid maliciously-constructed query agents from obfuscating data that is communicated from the computing entity. In certain examples, a query agent may be executed, and an identifier derived from the private-public key pair added to a result generated by the query agent prior to communication as a query result package.

Example Key Generation Process

Figure 9:
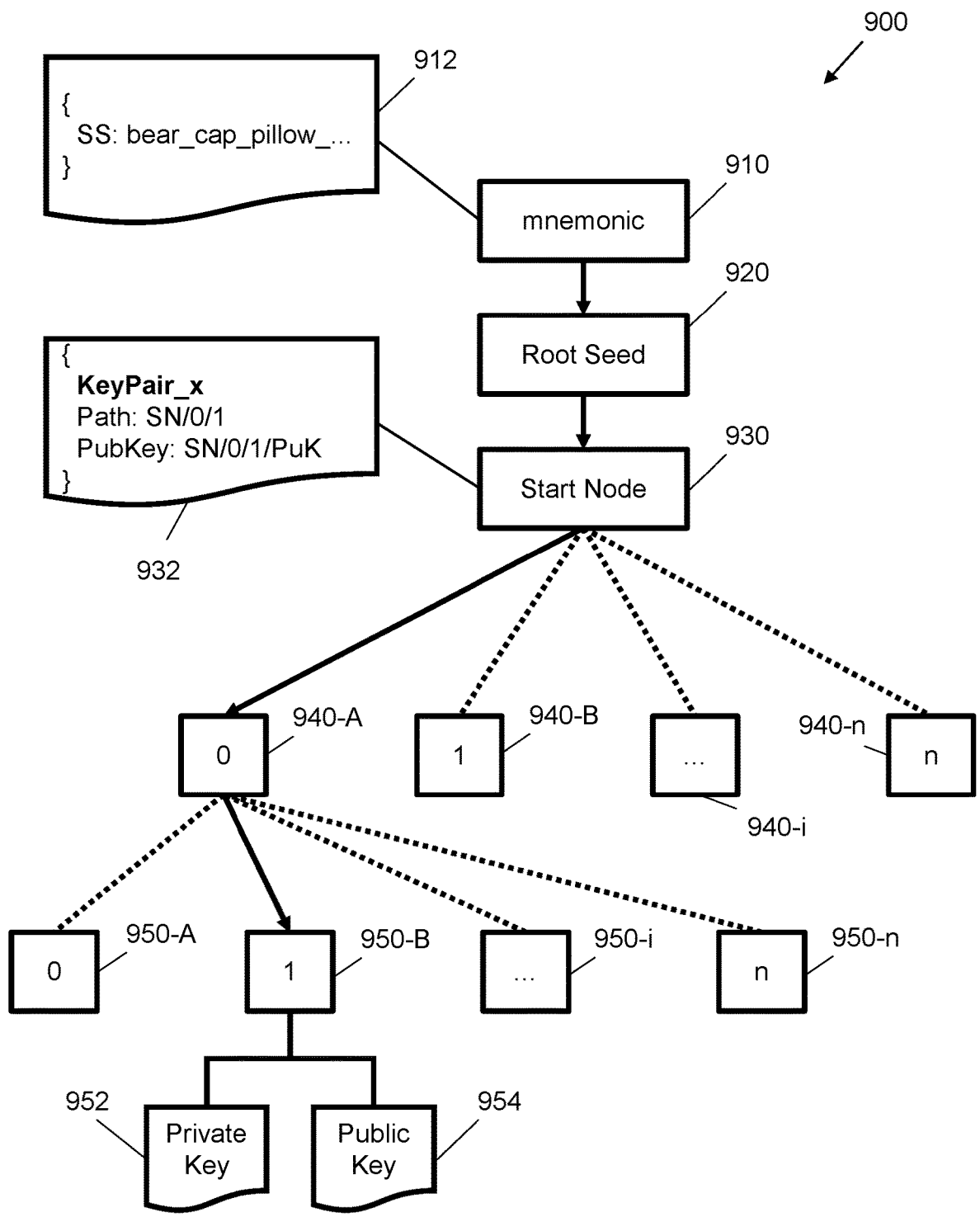
FIG. 9 is a schematic illustration showing a key-pair generation process according to an example.

FIG. 9 shows one example key generation process 900 that may be used to obtain the private-public key pair that is used to identify and authenticate communications that relate to a particular query. In one case, the key generation process may comprise any deterministic key generation process. Although one particular example of a deterministic key generation process 900 is shown in FIG. 9 this should not be considered limiting. In the present case, a "deterministic" key generation process is a process whereby a private and public key may be retrieved and/or re-generated based on parametric data. In the example of FIG. 9, a key path is used to retrieve a particular private and public key, where the key path may be of a much smaller size than the public and private keys (e.g., of a fixed length or below a threshold). In examples, the key generation process may be configured to generate a possibly infinite or practically-infinite number of externally uncorrelated public and private keys so as to provide security, i.e. such that knowing the public key does not allow identification of the computing entity in that instance or in aggregate and/or reverse engineering of the private key. A deterministic key generation process is of particular utility to the present examples, as it allows a use-limited private-public key pair to be generated per query, where each computing entity may process hundreds or thousands of queries per day.

The key generation process of FIG. 9 begins with the retrieval of a mnemonic 910. This may comprise a string sequence, e.g. as illustrated by data 912. It may be a random alpha-numeric string, a password and/or a series of concatenated random words. The mnemonic may form part of the private data of the computing entity as shown in FIG. 8A. Although a mnemonic is used here, in other examples, any other initial seed data may be used (e.g. that map to any form of binary string). The mnemonic is used to obtain a root seed 920. The root seed 920 may comprise a seed for a random number generator that is used to compute the public and private keys. It may comprise a random initial bit sequence. It may be obtained by applying a hash function to the bits that define the mnemonic string sequence. Using the root seed, a start or root node 930 for a key tree is determined. The key tree may be deemed to comprise at least the start node 930. In FIG. 9, the key tree comprises the start node 930 and two layers of branch nodes 940 and 950. Each node may reflect a private-public key pair. The key tree may have a predefined number of nodes within each layer; when the predefined number of nodes have been added a new layer may be generated. As such, nodes may be added to the key tree indefinitely to provide an infinite number of possible private-public key pairs. In the present case, each layer has n nodes (although different layers may have different number of nodes). In the present case, each node is given a number between 0 and n. This then allows a path through the key tree to be indicated. In the present example, the use-limited private-public key pair for a particular query is generated as a unique path through a key generation tree starting with the start node 930, where the root seed 920 sets the values of the keys associated with each node.

FIG. 9 shows a particular private-public key pair associated with node 950-B of a second layer of the key tree. Each node has an associated private key 952 and an associated public key 954. The private key and public key may be generated as a deterministic function of the root seed and the path through the key tree. This is shown in data 932. Here a path is defined as: the start node 930 (node "SN"), the first node of the first layer 940-A (node "0") and the second node of the second layer 950-B (node "1"). Hence, the path may be referenced using a path address such as "SN/0/1". Each of the private and public keys 952 and 954 may be obtained separately or together. For example, the public key 954 may be retrieved using the address "SN/0/1/PK". In one case, the private and public keys 952 and 954 may not be explicitly stored but instead may be referred to using the path address. Hence, the computing entity is able to generate each private-public key pair by pairing each query with a particular path address in the key tree but without storing hundreds or hundreds of thousands of separate keys. In one case, only the "tip" (i.e. node) of the last generated key may need to be stored to indicate a current location in the key tree.

In certain cases, the key tree may be generated in association with the functions of the TPM 470 of FIG. 4. For example, the TPM 470 may provide the random number generation associated with the root seed and the key generation functions. In one case, the mnemonic 910 may be replaced with a biometric identification bit sequence, e.g. as generated using an authentication device such as 480 in FIG. 4, and/or a user's biometric data may be used to encrypt a root seed (and thus enable the user to retract a root seed if it is compromised).

The key generation process 900 of FIG. 9 provides an efficient way of creating use-limited (e.g., ephemeral) identifiers, proving ownership of those identifiers (e.g., via digital signatures), allowing encryption of data if desired (e.g., via encryption with the private key, or using the private-public key pair to securely exchange a symmetric key) and avoiding high data storage requirements. In other examples, the use-limited private-public key pair may be generated in a different manner, e.g. via a random key generation process and stored in association with a query. In this latter case, a form of garbage collection may be implemented to delete key pairs after a certain time has passed or after the expiry of the original query (e.g., as set by the TTL field in the query data 132 or the content data 140 in FIGS. 1B and 1D).

In one case, one or more of the asymmetric private-public key pairs described above may be used for other encryption and/or decryption functions used in association with the computing entity. For example, a particular branch (e.g. 0/0/*) may be reserved for use in encrypting a computing entity and/or a state for the computing entity and/or other system requirements. Other branches may then be used for query responses as described above. In one case, symmetric keys may be preferred to encrypt large sets of data. If this is the case, asymmetric keys generated from the key tree may be used to encrypt a symmetric key, that is used to perform encryption as described herein.

Example Cloud Implementations and Entity Wrappers

Figure 10:
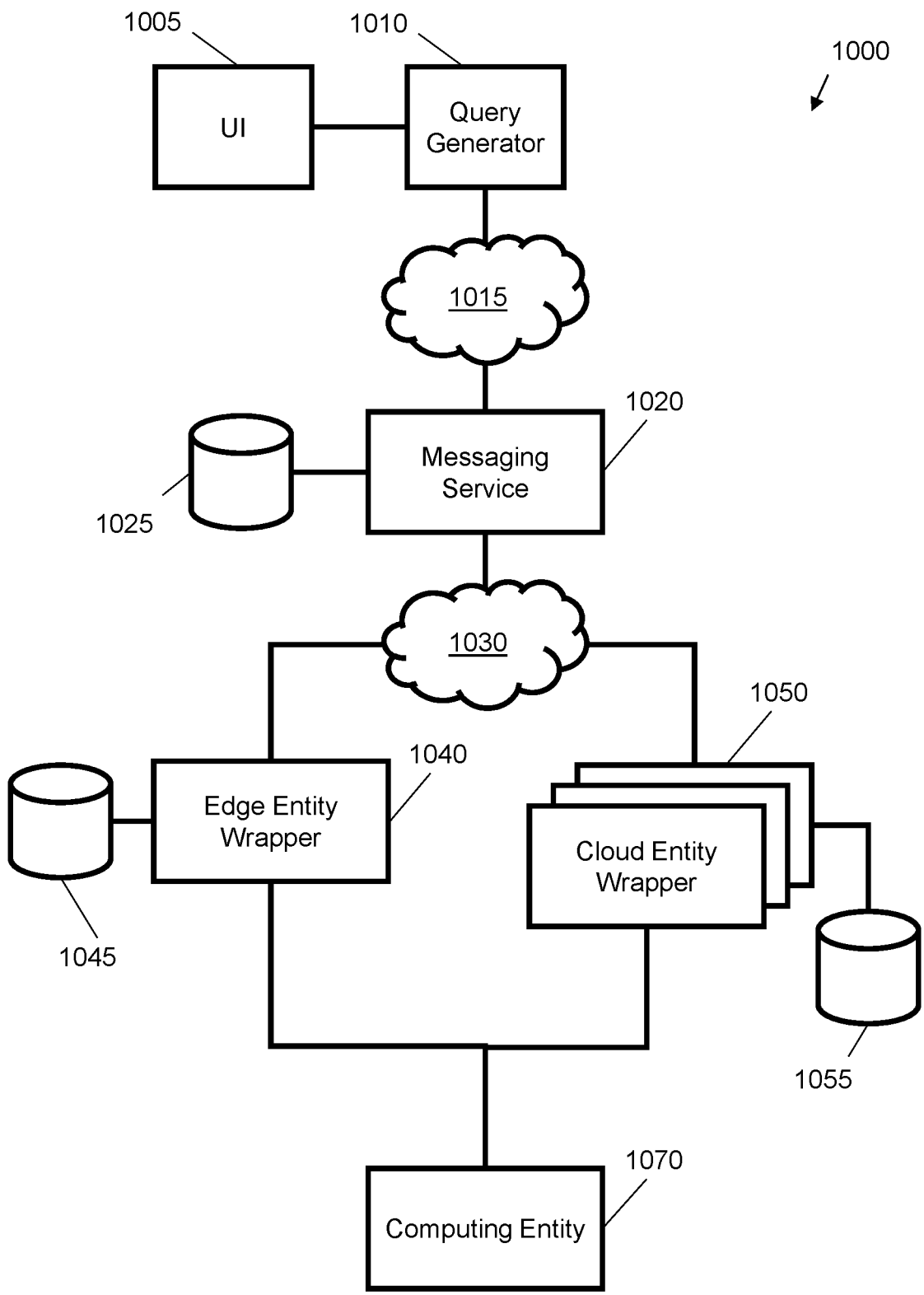
FIG. 10 is a schematic illustration showing an example variation of the system of FIG. 1A.

FIG. 10 shows a variation 1000 of the examples of FIGS. 1A, 1C and 2. In this variation 1000, a distributed computing system comprises a mixture of edge-implemented computing entities and cloud-implemented computing entities. This example demonstrates how the form of the computing entity may vary while still using the multi-directional zero-knowledge attestation methods of the previous examples.

The distributed computing system of FIG. 10 comprises one or more user interfaces 1005, a query generator 1010, a first set of one or more networks 1015, a messaging service 1020, a data store for the messaging service 1025, a second set of one or more networks 1030, an edge entity wrapper 1040, a data store for the edge entity wrapper 1045, a cloud entity wrapper 1050, a data store for the cloud entity wrapper 1055 and an example computing entity 1070. The user interface 1005, query generator 1010 and messaging service 1020 may be implemented as described with respect to the user interface 330, query generator 320 and messaging service 310 of FIG. 3. Different user interfaces may be provided for different sets of query agents and/or different functions of a query agent. Queries may also be generated and/or published using one or more APIs. In the present example, the data store for the messaging service 1025 may store one or more of query data and content data as described with reference to storage device 324 in FIG. 3. The messaging service 1020 may access the data store 1025 to allow the computing entity 1070 to access query data and/or content data. It may also store one or more query result packages from computing entities in the data store 1025.

The messaging service 1020 is communicatively coupled to the edge entity wrapper 1040 and the cloud entity wrapper 1050 via the second set of one or more networks 1030. Although two sets of networks are shown in this example, they may comprise the same network, different portions of the same network or overlapping portions of different networks. Like the computing entity of previous examples, the edge entity wrapper 1040 and the cloud entity wrapper 1050 may comprise a device or process that manages the computing entity 1070. For example, the edge entity wrapper 1040 and the cloud entity wrapper 1050 may instantiate the computing entity 1070 as described below. The edge entity wrapper 1040 may be implemented by an edge device, such as edge device 606 in the sequence diagram of FIG. 6. The edge entity wrapper 1040 may thus comprise a kernel service that operates on a computing device such as 410 in FIG. 4. The data store for the edge entity wrapper 1045 may be a local or remote data store. For example, it may comprise a data store on an edge device, such as a solid-state memory for a smartphone, and/or cloud-based data storage. Access may be mediated by a data storage interface such as 450 of FIG. 4. The edge entity wrapper 1040 may be responsible for instantiating the computing entity 1070. Although one computing entity is shown, the edge entity wrapper 1040 may manage a plurality of computing entities, such as different computing entities for different users of a multi-user operating system. Use of the edge entity wrapper 1040 thus avoids a need for a one-to-one correspondence between a computing device and a computing entity, similar to the way in which one physical computing device may implement a plurality of different virtualised devices. In a similar manner to the virtualisation case, each computing entity may be sandboxed such that no computing entity may access another entity's processes and/or data. In certain cases, this may be performed using kernel or application-level virtualisation as provided by an operating system.

The cloud entity wrapper 1050 may provide a functionality similar to the edge entity wrapper 1040 but may provide this functionality as a cloud computing service rather than on an edge device. For example, the cloud entity wrapper 1050 may be implemented as a server process on a server computing device. The cloud entity wrapper 1050 may enable users to access associated computing entities via thin clients such as a computer browser, where the computer browser provides a connection to the server computing device implementing the cloud entity wrapper 1050. In FIG. 10, the cloud entity wrapper 1050 is shown with multiple boxes as it may implement a much larger plurality of computing entities than the edge entity wrapper 1040 (e.g., hundreds, thousands or hundreds of thousands as compared to one to ten). The data store for the cloud entity wrapper 1055 may be used in a similar manner to the data store for the edge entity wrapper 1040 and may also be accessed via a data storage interface of the server computing device (e.g., may be local or remote storage). In one case, both the edge entity wrapper 1040 and the cloud entity wrapper 1050 may encrypt the data and/or computer program code for the computing entity 1070 when it is not in use and store this in the associated data store (e.g., similar to the "sleep" mode described with reference to FIG. 6 and further presented with the later example of FIG. 15).

Figure 11:
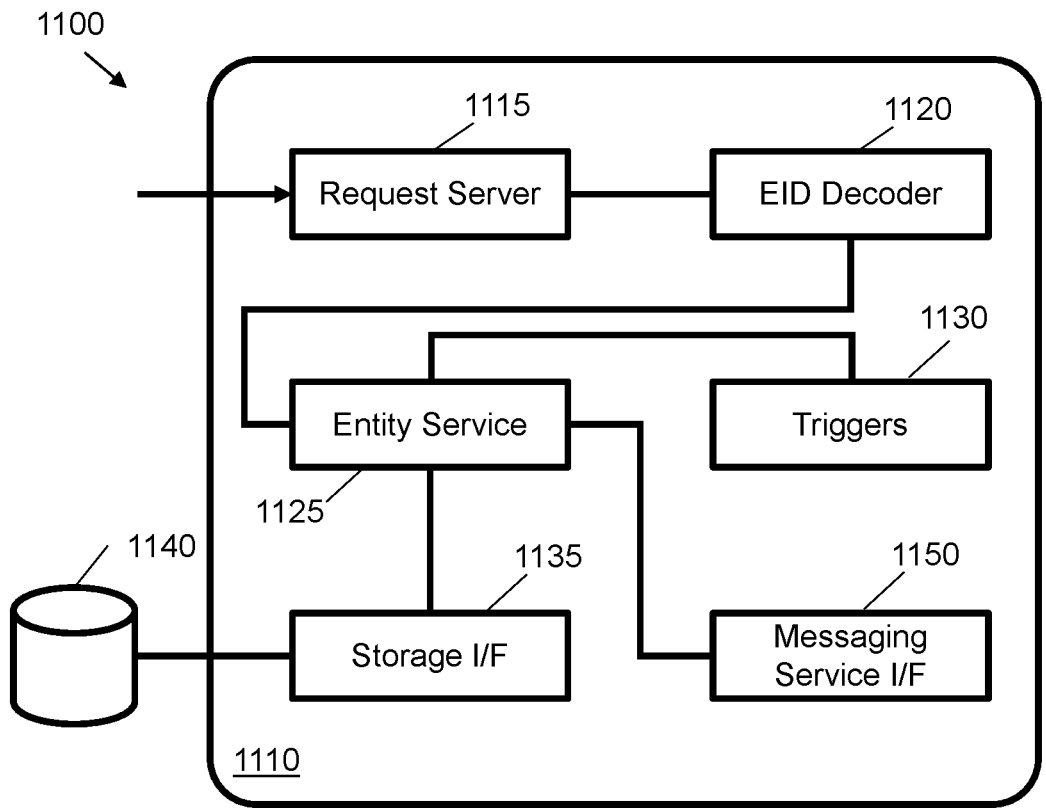
FIG. 11 is a schematic illustration showing a wrapper for a computing entity according to an example.

FIG. 11 shows an example 1100 of a general entity wrapper 1110 that may be used to implement one or more of the edge entity wrapper 1040 and the cloud entity wrapper 1050 of FIG. 10. The general entity wrapper 1110 of FIG. 11 comprises a request server 1115, an entity identifier (EID) decoder 1120, an entity service 1125, a set of triggers 1130, a storage interface for coupling to a data store 1140 and a messaging service interface 1150. The request server 1115 is configured to receive requests from one or more applications or processes. For a cloud entity wrapper, the requests may comprise HTTP(S) requests and so the request server 1115 may be implemented as a webserver. For an edge entity wrapper, the requests may be made to an API for the entity wrapper, e.g. by local applications running on an edge device, and/or a webserver that is listening for communications on a local loopback address (such as localhost). The API may use one or more operating system APIs. In general, the request server 1115 provides a mechanism to handle remote program calls to a particular computing entity. The entity identifier decoder 1120 is configured to receive and/or extract an entity identifier associated with a particular request. The entity identifier may comprise the identifier 810 of FIG. 8, and may be an internal UUID. The UUID may be different from the root seed 920 for added security. For requests made over the Internet, the entity identifier may be packaged within a cookie and extracted by one or more of the request server 1115 and the entity identifier decoder 1120. If the entity identifier is encoded or encrypted the entity identifier decoder 1120 may decode or decrypt the identifier. The entity service 1125 is configured to instantiate computing entities (e.g., such as 1070). The entity service 1125 receives an entity identifier from the entity identifier decoder 1120. The entity identifier identifies which computing entity is to be instantiated.

In certain cases, a computing entity may be instantiated in response to a trigger being met, e.g. instead of, or as well as, the receipt of a request via request server 1115. In this case, the set of triggers 1130 may comprise one or more monitoring services that watch for certain conditions being met and initiate the instantiation of a computing entity in response to conditions that are associated with that condition being met. For example, each trigger may comprise a set of conditions and an entity identifier; when the set of conditions are met, the entity identifier may be communicated to the entity service for instantiation.

The storage interface 1135 may operate in a similar manner to data storage interface 450 in FIG. 4. It may control the access of one or more of the data stores 1045 and 1055 of FIG. 10. In one case, computing entities may be de-instantiated when not in use. In this case, on receipt of an entity identifier, the entity service 1125 may retrieve computer program code and/or data associated with the identified computing entity from the data store 1140 via the storage interface 1135. The storage interface 1135 may provide for any abstraction and/or authentication that is needed to access remote (e.g., cloud) data stores 1140. A combination of local and remote storage may also be used in certain cases.

Lastly, in FIG. 11, the entity service 1125 is also communicatively coupled to a messaging service interface 1150. This may provide an interface to the messaging service 1020 of FIG. 10. In use, when a computing entity is instantiated by the entity service 1125, a messaging component of the computing entity, such as the messaging component 520 of FIG. 5, may communicate with the messaging service 1020 via the messaging service interface 1150 (e.g., it may provide one or more of the operations performed by the edge device 606 in FIG. 6). In one case, a computing entity may check for unread messages at the messaging service 1020 following instantiation. Push and pull mechanisms are possible and either or both may be implemented. Pull mechanisms may be preferred as these may avoid the computing entity giving away information such as (local) IP addresses or computing device attributes by enabling the entity to control its own network ingress and egress routes as discussed in the examples above.

Figure 12:
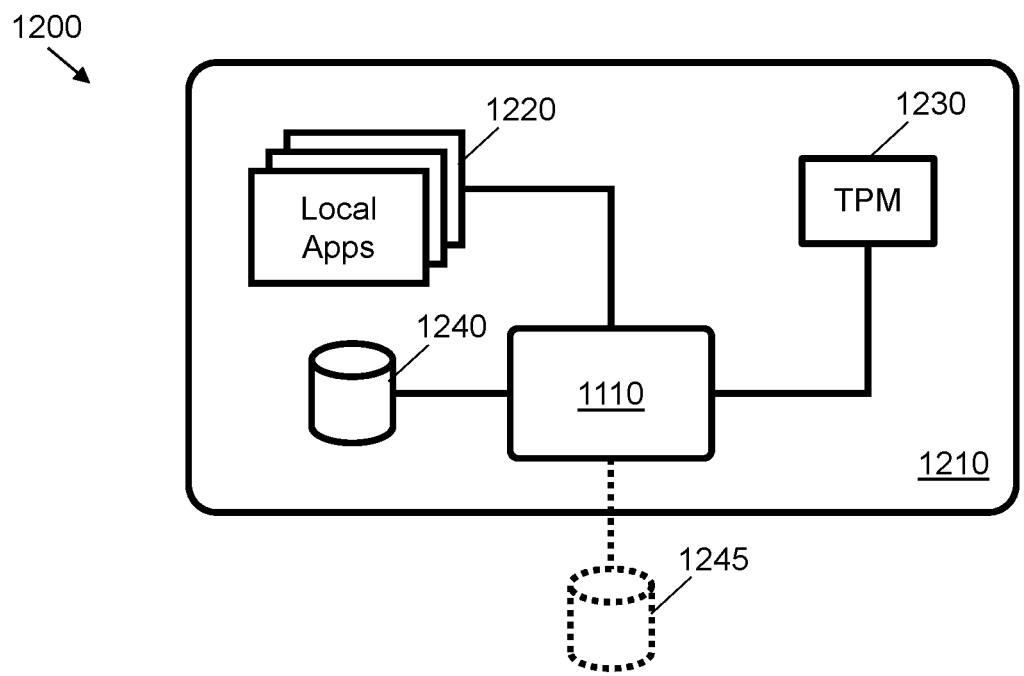
FIG. 12 is a schematic illustration showing an example mobile computing device that incorporates the wrapper of FIG. 11.

FIG. 12 shows an example 1200 of how the general wrapper entity 1110 may be implemented within a local computing device 1210, such as a smartphone. FIG. 12 shows how the general wrapper entity 1110 may interact with certain components of a local computing device 1210. The local computing device 1210 may be implemented in a similar manner to the computing device 410 of FIG. 4.

In FIG. 12, the general wrapper entity 1110 is implemented as an edge wrapper entity (e.g., similar to edge wrapper entity 1040 of FIG. 10). Within the local computing device 1210 there are a plurality of locally implemented applications 1220, a TPM 1230 and a local storage device 1240. The plurality of application 1220 may be implemented in a similar manner to the computing entity 442 of FIG. 4, i.e. via a processor and computer program code loaded into memory. The TPM 1230 may be a co-processor similar to TPM 470 of FIG. 4, and may provide local cryptographic services to the general wrapper entity 1110 (e.g., encryption and decryption of a computing entity and/or any associated data, key generation and retrieval, digital signature functionality, and/or local authentication functions). The local storage device 1240 may be a hard disk and/or solid-state storage device for the local computing device 1210. There is also an option to use remote storage 1245 as previously described. Both the local storage device 1240 and the optional remote storage 1245 may be communicatively coupled to the storage interface 1135 as shown in FIG. 11.

In use, the local applications 1220 may make requests to the request server 1115 of FIG. 11. For example, a locally running application 1220 within the local computing device 1210 may request that a computing entity provide a local attestation. In this case, the request server 1115 may receive the request and determine a computing entity to receive the request. In a simple case, there may only be one computing entity present on the local computing device 1210 but functionality of one or more of the request server 1115, the entity identifier decoder 1120, the triggers 1130 and the entity service 1125 may be used to instantiate the one computing entity (e.g., from a sleep or inactive mode). The request may take a form similar to the query data described above. In certain examples, the local applications 1220 may be used in place of the messaging service of previous examples, and the methods herein may be performed locally using a data exchange similar to that shown in the earlier Figures.

In one case, matches to evaluated queries may be stored as part of a computing entity (e.g., using the ZKPData of FIG. 8A or similar). A local application may request access to one or more of these matches. In this case, the computing entity, e.g. as implemented by the general wrapper entity 1110, may respond to the local application with data similar to the query result package 134 of FIG. 1, i.e. an indication of the result of the query, an identifier, proof, and/or a digital signature to authenticate the result. In this manner, the computing entity may use the local applications as intervening entities for interactions with third parties, where the local applications may communicate with third parties such as the messaging service of previous examples and/or their own computing services. The local applications may also manage actions such as is shown in FIG. 2.

In one case, a query may be retrieved from a messaging service as previously discussed. Based on the retrieved query data an attestation may be requested. The query may comprise a geo-query that is broadcast by the messaging service to all computing entities. A computing entity may retrieve the geo-query and execute the query to determine a match. In this case, the result of the query may be an indication that the computing entity is classified as belonging to a particular location segment A. At a later point in time, one of the local applications may query the computing entity and the computing entity may use the location segment A to generate a response. In this case, the messaging service acts as an intermediary and intermediary helps preserve a user's privacy.

In one case, as described with reference to the edge entity wrapper as described above, several computing entities relating to different members of a family may be primarily stored and instantiated via a home desktop computer or home server. In this case, each family member may also use a tethered smart phone as an interface for the computing entity (e.g. the computing entity may have a form of local distributed instantiation, similar to the example of FIG. 2). As another example, an Internet of Things (IoT) device may be shared between multiple computing entities. In this case, the IoT device may be coupled to one or more entity edge wrappers in a similar manner to the local applications 1220 or TPM 1230, and its data may be shared across several different computing entities (e.g. thermostat data may be shared between computing entities for a set of housemates or family members). In certain cases, computing entities (e.g. within a secure inner ring) may be able to communicate and share portions of the private data.

Example Methods

Figure 13:
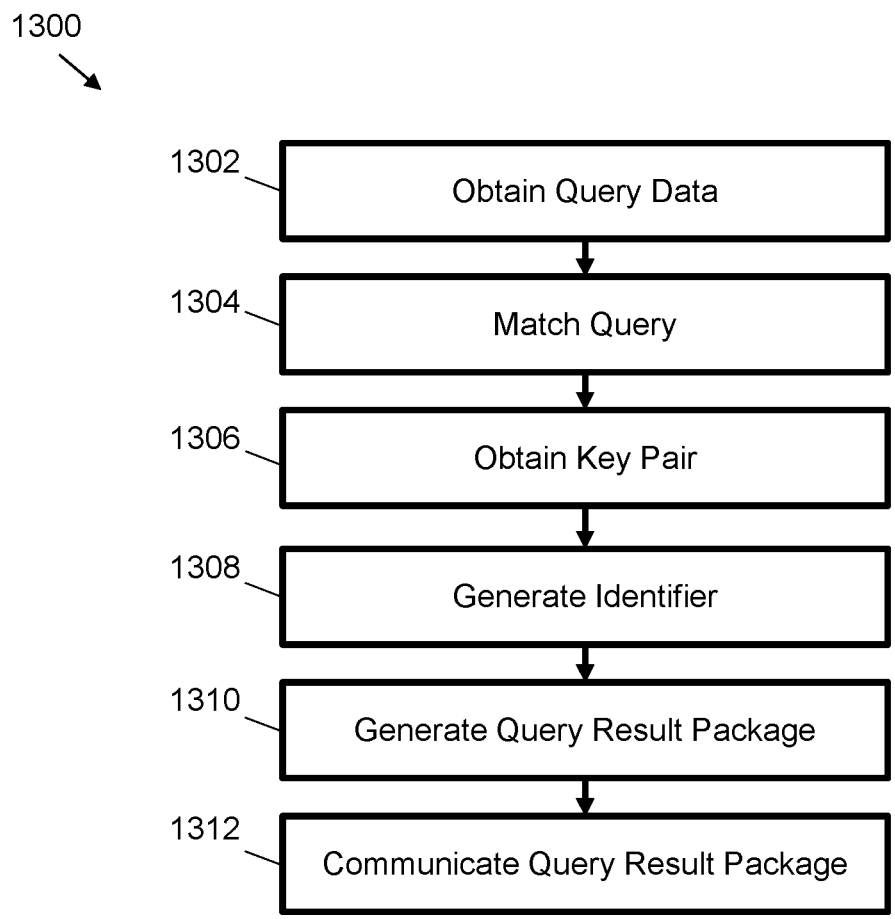
FIG. 13 is a flow diagram showing a computing entity method for secure selective distribution of content according to an example.
Figure 14:
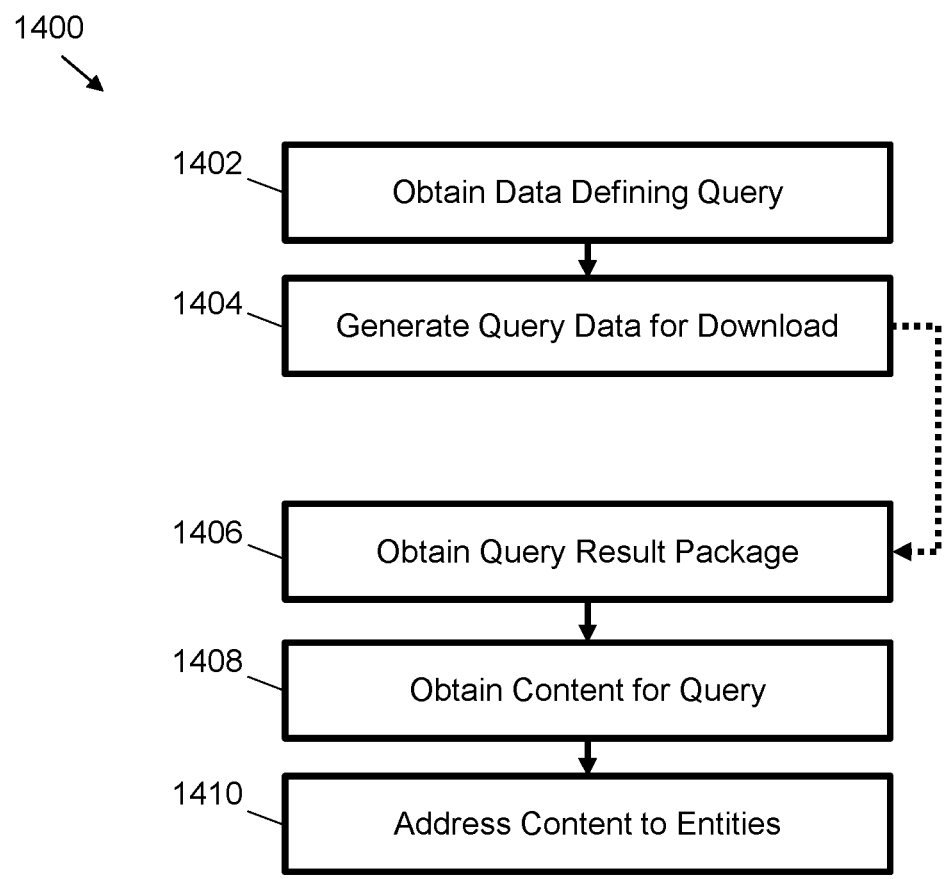
FIG. 14 is a flow diagram showing a server method for secure selective distribution of content according to an example.

FIGS. 13 and 14 show a set of example methods that may implement a multi-directional zero-knowledge attestation protocol. The example methods may be applied using the distributed systems described above. FIG. 13 shows a computing-entity-based method 1300 and FIG. 14 shows a corresponding server-based method 1400. The method 1300 of FIG. 13 may be implemented by a computing entity, and/or a computing device implementing the computing entity. The method 1400 of FIG. 14 may be implemented by the messaging service, and/or a server computing device that communicates with a set of computing entities.

The method 1300 of FIG. 13 begins at block 1302, where query data is obtained. The query data may be obtained using one or more of the messaging service interface 1150 of FIG. 11 and the messaging component 520 of FIG. 5. The query data may be obtained by and/or for a given computing entity within a set of computing entities, e.g. one of computing entities 130, 230, 442 or 510. The query data may comprise the query data 132 of FIGS. 1A and 1B. It may be obtained over at least one network from a messaging service, such as 130 in FIG. 1A. In other cases, it may be obtained from a local application such as one of local applications 1220 in FIG. 12.

At block 1304, the method comprises matching a query defined by the query data against private data for the computing entity. The private data may be held within a secure data store, e.g. as described with reference to the above examples. The query may be implemented as a Boolean expression that is evaluated against the private data. The query is evaluated within a secured execution space for the given computing entity. As described above, this may involve a restricted space of working memory, encrypted data and/or read/write control. The secured execution space may be provided using operating system and/or cryptographic co-processor tools and functions.

At block 1306, a use-limited private-public key pair is obtained for the query. The private-public key pair may be generated and/or retrieved as shown in the example of FIG. 9. In other cases, the private-public key pair may be randomly generated, e.g. using a key generation procedure provided by an operating system service and/or a cryptographic co-processor. As explained above, the private-public key pair may be reserved for use in association with the query, e.g. to digitally sign communications associated with the query. Communications associated with a query may include query result packages and/or action responses as shown in the example of FIG. 2. The private-public key pair may be determined for the query, wherein different use-limited private-public key pairs are obtained for previous and/or subsequent queries. The private-public key pair may also be used to encrypt data relating to the query, or to encrypt a further key (such as a symmetric key) to encrypt the data.

At block 1308, the method 1300 comprises generating an identifier for the computing entity using the public key of the use-limited private-public key pair. In certain cases, the identifier comprises the public key; in other cases, the identifier comprises a function of the public key. As the private-public key pair is use-limited, the identifier cannot be used to track the activity of the computing entity over time, and/or collate information associated with multiple queries. Different queries may have different identifiers.

At block 1310, a query result package is generated based on a match for the query. The query result package comprises the generated identifier, e.g. as shown in FIG. 1B. The query result package acts as a zero knowledge attestation. For example, in a simple case, the presence of a query result package comprising a public key as an identifier provides evidence that the computing entity and/or its private data is a match for the query but does not provide any information regarding the computing entity or provide any data from the private data.

At block 1312, the query result package is provided. The query result package may be transmitted over at least one network to the messaging service in response to block 1302.

In other cases, the query result package may be communicated and/or transmitted to an application that may use and/or forward the query result package. In one case, the query result package may be appended as a block in a distributed ledger and/or stored as data in a distributed file system such that it is accessible to third parties such as a query creator.

In the method 1300, the computing entity is configured to obtain content associated with the query that is addressed to the identifier for processing at the computing entity. This content may be included in a payload associated with retrieved query data. The content may comprise one or more of: executable program code for execution, image data for display, video data for display, audio data for output, and/or a command for execution. Content may be actuated, which may comprise executing, displaying and/or otherwise outputting the content or a processed output derived from the content. Actuation may be performed by the computing entity or another device, e.g. a device communicatively coupled to the computing entity. The content may be obtained from the messaging service, a third-party entity and/or an application.

In the method 1300, the computing entity may be configured to use the private key of the private-public key pair to authenticate data that relate to the query. This may comprise digitally signing communications or other data that relate to the query using the private key. The digital signature may then be verified using the public key of the private-public key pair. The public key is thus able to provide a dual utility: one, to be used as an identifier for the computing entity in relation to the query; and two, to be used to authenticate communications as relating to the combination of computing entity and query (e.g. provide non-repudiation). As described above, the communications may comprise the query result package (e.g., as shown in FIG. 1B), a request for content (e.g., as shown in FIG. 1D), an action message (e.g., as shown in FIG. 2), or any other update that specifically relates to the query. In certain cases, a query creator may provide a public key with the query data. In this case, computing entities may also encrypt responses (including query result packages) using the query creator public key, such that only the query creator (e.g. as opposed to the messaging service) may access the response.

In certain examples, blocks 1306 to 1312 are performed conditional on a positive match for the query, e.g. in the case where a Boolean expression evaluates to 1 or True. In these examples, no query result package is provided at block 1312 responsive to a negative match for the query, e.g. in the case where a Boolean expression evaluates to 0 or False. In the case, that blocks 1302 and/or 1304 include self-selection by the computing entity (e.g., where the computing entity may selectively evaluate the query), then an eaves-dropping device is unable to determine whether no query result package is uploaded due to a negative match or just because the computing entities does not evaluate the query. This may thus provide an extra level of anonymity and security.

In certain examples, following block 1312, the method further comprises the blocks of: performing an action associated with the query defined by the query data; and communicating a message following the action. In this case, the message may be digitally signed using the private key of the private-public key pair. The message may thus indicate that the action was performed by a computing entity that had a successful match for the query defined by the query data. In one case, the method 1300 may comprise: obtaining, at the given computing entity over the at least one network, content addressed to the identifier from the messaging service; executing a process to actuate the content; and performing an action related to the content following the actuation of the content, wherein the action comprises communicating data over the at least one network that is digitally signed using the private key of the use-limited private-public key pair. These blocks may provide a method similar to that shown in FIG. 2.

In one case, instead of digitally signing further messages using the private key of the use-limited private-public key pair, a new use-limited private-public key pair may be generated. This may enhance the independence between a query and future messages; for example, in certain situations, although future messages may wish to refer to the result of the query, it may be desired that this information is not made public. In this case, one or more of blocks 1302 to 1312 may be repeated for a further query, where the further query comprises at least a determination of whether the earlier query defined by the query data (e.g., the query of method 1300) resulted in a successful match. For example, within the secured execution space for the computing entity, the further query may be matched against private data for the computing entity within the secure data store; a further use-limited private-public key pair may be obtained for the further query; a further identifier may be generated for the computing entity using the public key of the further use-limited private-public key pair; a further query result package may be generated based on the successful match for the further query, where the new public key is used for the identifier; and the further query result package transmitted in response to an action associated with the query defined by the query data. The further query result package may thus be used to indicate that the action was performed by a computing entity that had a successful match for the query defined by the query data.

In certain cases, the use-limited private-public key pair is obtained at block 1306 using a deterministic method. This means that a particular use-limited private-public key pair may be retrieved or regenerated based on key definition data (i.e. parameter) data, where the key definition data is supplied to the deterministic method. The key definition data may be smaller in size than the private-public key pair. In one case, the deterministic method is executed within the secured execution space and the key definition data (e.g. a key path or other data as described with reference to FIG. 9) is not accessible outside of the computing entity.

In one case, block 1306 comprises: obtaining a root seed; and generating the use-limited private-public key pair as a unique path through a key generation tree starting with a start node. This may comprise the method illustrated in FIG. 9. The key generation tree is based on the root seed and the private-public key pair are retrievable using an address of the unique path, i.e. a path through the key generation tree. Nodes of the key generation tree may have associated private-public key pairs (and/or data used to generate such pairs such as seed data), so a path to a node may allow a particular private-public key pair to be retrieved and/or re-generated.

In one case, one or more of the computing entity and its data is encrypted when not in use. The private data may form at least a portion of a state for the computing entity, and the state and/or the portion may be encrypted. In certain cases, such as those illustrated in FIG. 7, the query is defined as an action to be performed on the state, such as data within an encrypted portion of the state. The computing entity may be configured with a queue for a plurality of actions that request access to the encrypted portion (or a subset of the encrypted portion). In this case, matching a query defined by the query data may comprise writing an outcome of the match for the query to the state for use in generating the query result package.

In one case, such as one of the cases shown in FIGS. 5 and 7, the query data relates to one of a plurality of query agents that are implemented together with the given computing entity. In this case, the method 1300 may further comprise: determining a query agent from the plurality of query agents to process the obtained query data; and processing the query data as an action with the determined query agent.

In one case, prior to block 1302, the method may comprise: determining a capacity of a query queue for the computing entity; and polling the messaging service for query data for a plurality of queries to fill the capacity of the query queue.

In one case, the method 1300 may comprise managing a query load. This may comprise determining a number of queries that have query data available at the messaging service (e.g., representing a "demand" for query execution) and determining a number of query result packages that have been received at the messaging service from the set of computing entities (e.g., representing a "supply" of executed queries). In this case, the query data for one or more available queries may be varied based on the determined number of queries and the determined number of query result packages, i.e. based on the "demand" and the "supply". If the demand was higher than the supply, representing more queries to be evaluated than there is capacity across the set of computing entities for execution, then constraints on the query data (e.g., indicating which computing entities are to execute the queries) may be relaxed such that more computing entities can evaluate queries. On the other hand, if the supply was higher than the demand, representing more computing entities available to execute queries than there are queries to execute, then constraints may be added to the query data. In general, one or more metrics may be evaluated to allow for static and/or dynamic refinement of query data at the messaging service and/or selection functions at the computing entities. Other approaches that may also be implemented include adding random selection on one or more of the "supply" and "demand" sides (e.g. with respect to the computing entities and the messaging service/query generator). Varying the properties of random selection may stabilise supply and demand. In certain cases, to increase supply, incentives such as rewards and/or micro-payments may be provided.

In certain cases, block 1306, and/or the method 1300 in general, may be performed based on authentication of a user. The method may thus comprise authenticating a user of the computing entity to allow access to the private data for performing the query. This may be performed using one or more of a PIN, face identification, fingerprint identification and/or password authentication. It may be performed in association with security functions of a computing device hosting the computing entity.

In one case, a query creator may encrypt query data. In this case, a query creator may first generate a private-public key pair. The query creator creates a query and includes the public key from the private-public key pair. A computing entity pulls the query data as described above and processes it. The computing entity generates a symmetric key and encrypts at least a portion of the query result package (e.g. a payload). The computing entity then encrypts the generated symmetric key using the query creator's public key. The computing entity then digitally signs the entire query result package using the private key from its private-public key pair as described in the paragraphs above. The computing entity transmits the query result package and this is eventually obtained by the query creator. The query creator is then able to validate the query result package using an identifier associated with the package, which is the public key of the computing entity's private-public key pair for the query. The query creator decrypts the encrypted symmetric key from the computing entity using the private key from its private-public key pair. The query creator can now decrypt the query result package using the decrypted symmetric key. This process may also be used to establish a communications channel between the query creator and the computing entity that uses deterministically generated keypairs for future communications without any eavesdropper being away that all the messages related to the same conversation.

In one case, the computing entity is implemented as a secure process on a server computing device. In this case, the server computing device may implement a plurality of computing entities associated with a corresponding plurality of users. This may be the case when a cloud entity wrapper is used as shown in FIGS. 10 and 11. In other cases, the computing entity may be implemented as a secure process on a mobile computing device associated with a user. For example, this may be the case where the computing entity is implement using an edge entity wrapper as described with reference to FIGS. 10 to 12. In both cases, the server computing device and the mobile computing device may be implemented using a configuration similar to that shown in FIG. 4.

FIG. 14 shows a server-based method 1400. The method 1400 may be performed by a messaging service of the previous examples or another server entity. The method 1400 may be performed in two stages based on interactions with one or more computing entities. Blocks 1402 and 1404 form a first stage and blocks 1406 to 1410 form a second stage.

At block 1402, the method 1400 comprises obtaining data defining a query to be performed across a set of computing entities. The set of computing entities may comprise the computing entity associated with the method 1300 of FIG. 13 and may be arranged as shown in FIGS. 1A and 1C. It should be noted that a set of computing entities in practical implementations may comprise thousands, hundreds of thousands or millions of entities. It should also be noted that the method 1400 may be performed by a plurality of distributed server entities. Block 1402 may comprise operations similar to those shown in the example of FIG. 3.

At block 1404, query data is generated that is available for download by the set of computing entities over at least one network. The query data may be available via a data storage device such as storage device 324 in FIG. 3 or data store 1025 in FIG. 10. In one case, the query data may be appended to a distributed ledger. The query data may be of a form similar to that shown in the example of FIG. 1B. The query data may be encrypted in certain implementations.

Blocks 1402 and 1404 may comprise a set of query preparation operations. Following block 1404, a messaging service may await reading of the query data by computing entities that poll the messaging service for new query data. The computing entities may retrieve the query data in response to this polling, e.g. from the messaging service as shown in FIG. 1A. Alternatively, the messaging service may broadcast either the query data itself or provide an address of the query data to the computing entities. In the latter case, the computing entities may retrieve the query data from third party devices, e.g. they may download the data directly from the data store 1025 in FIG. 10. If the messaging service is implemented using a distributed file system and/or distributed ledger, block 1404 may comprise making the query data available on the distributed file system and/or the distributed ledger. In the latter case, this may comprise writing a block comprising the query data, or a link to the query data, to the distributed ledger, where the distributed ledger may be synchronised to one or more nodes that are accessible to the computing entities.

In any case, following block 1404, a computing entity may be able to perform the method 1300 of FIG. 13. Blocks 1406 to 1410 of FIG. 14 may thus be performed following block 1312 of method 1300 of FIG. 13. At block 1406, a query result package is obtained from each of a subset of the set of computing entities. The subset may reflect computing entities that successfully match the query and/or that choose to (or are able to) respond to the query. The query result package may be received over at least one network as shown in FIG. 1A. In certain examples, the query result package may be written to one or more of a distributed file system and a distributed ledger. For example, computing entities may write the query result package as an additional block to the distributed ledger. The query result package may also be encrypted, e.g. using a public key provided with the query data (e.g. from a query creator). In this case, the messaging service may not have access to a decrypted version of the query result package. One or more of a distributed file system and a distributed ledger may be used as the current methods and systems are designed to operate with trustless architectures. In a similar manner to the query data, it is also possible to use (encrypted) links to provide the query result data, e.g. a computing entity may provide an encrypted link in a block payload in a distributed ledger, such that a query creator may decrypt the link and obtain an encrypted version of the query result package via the link (e.g. accessible upon a distributed file system). In these cases, there may be no central authority that controls the system.

The receipt of a query result package may indicate a match for the query, where the query result package comprises an identifier for a corresponding computing entity and acts as a zero knowledge attestation, e.g. comprises the query result package generated via block 1310 of the method 1300. Query result packages are obtained from a subset of computing entities, as only a subset of entities may have a positive query match. At block 1408, content associated with the query is obtained. This may comprise retrieving content that is stored with the query data, e.g. in a storage device such as 324 in FIG. 3, and/or retrieving content from another location. At block 1410, the content is addressed to the subset of the set of computing entities using the identifiers from the received query result packages, e.g. using the public keys for computing entities with query matches. This may be performed as shown in association with FIGS. 1C and 1D.

Following blocks 1406 to 1410, a computing entity whose identifier is included in the address data prepared at block 1410 may obtain the content for actuation. For example, the content may be obtained as part of the query data, using a link within the query data or downloading the content or a link to the content from an appended block in a distributed ledger that comprises the query-specific identifier for the subset of the set of computing entities.

In the example of FIG. 14, data provided by the subset of the set of computing entities may be authenticated by verifying a digital signature applied to the data. For example, the data may comprise the query result package provided at block 1406 and/or a further communication that relates to the query. In the latter case, the further communication may be communicated explicitly over a network, e.g. as a network message, and/or provided for access using a distributed ledger or file system. For example, a further communication or message may be implemented by a computing entity by writing an additional block to a distributed ledger, where the additional block indicates the identifier relating to the query for that computing entity and has a digital signature. In any case, the digital signature may be verified using an entity-specific public key associated with the query that is obtained from the identifier for a given computing entity. In certain cases, the identifier may comprise the public key (or an encrypted version of the public key). The digital signature is generated using a corresponding private key associated with the query Any further communication may be formatted similar to the action message 265 in FIG. 2, i.e. be signed using a private key associated with the public key that is use limited in association with the query. This digital signature is query specific, and so indicates a successful match for the query.

In certain cases, the method 1400 may further comprise receiving a further communication over the at least one network from the computing entity making the request at block 1412. The further communication may relate to an action performed in association with the content. In this case, the method may comprise authenticating the further communication as originating from the given computing entity by verifying a digital signature applied to the further communication. This digital signature may be generated and appended in a similar manner to the digital signature that is verified at block 1414 of FIG. 14, i.e. the digital signature is generated by the computing entity using the private key associated with the query and the digital signature may be verified using the corresponding public key associated with the query. For example, this may be similar to the process described with reference to FIG. 2.

Example Instantiation Method for a Cloud Entities

Figure 15:
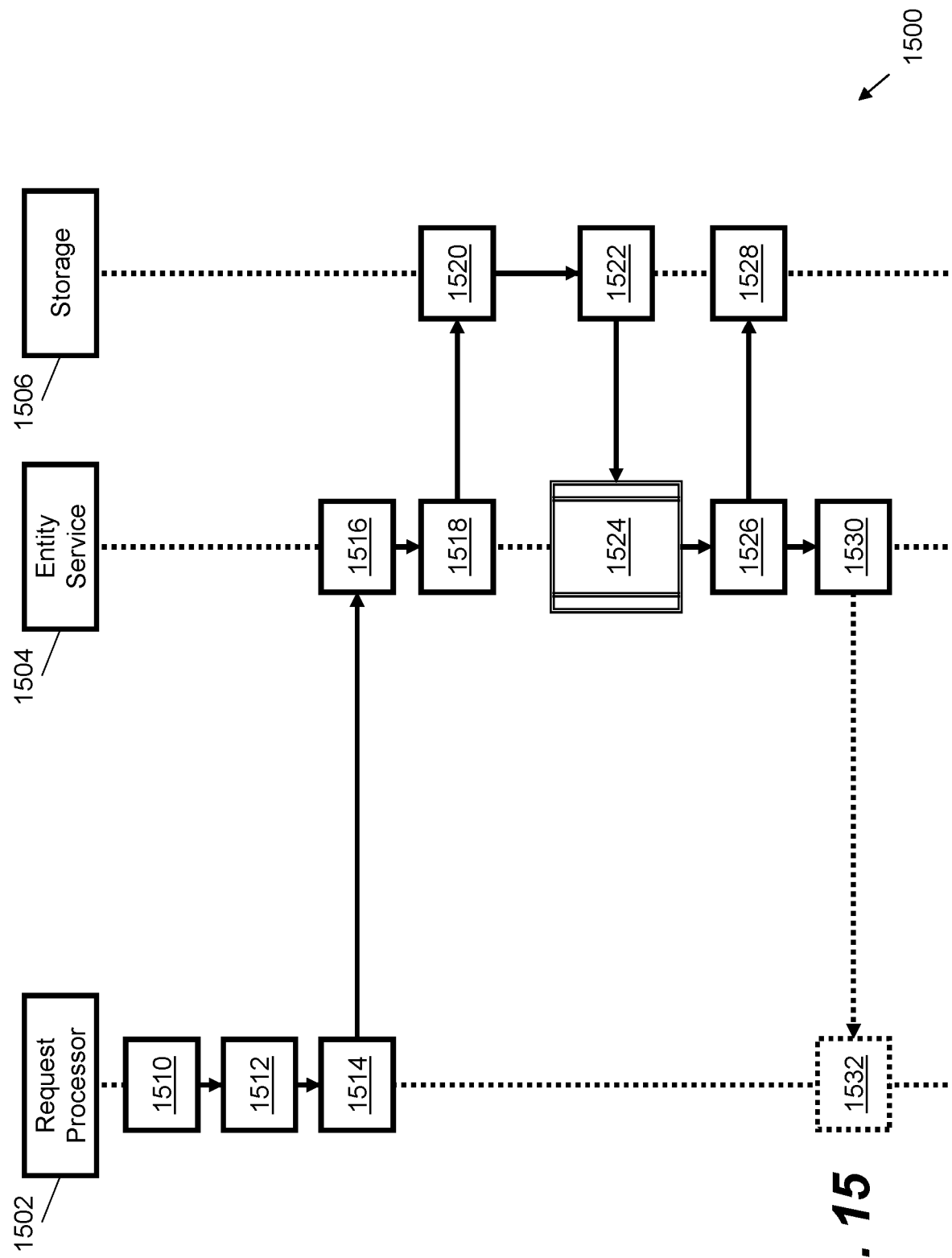
FIG. 15 is a sequence diagram showing instantiation of a computing entity according to an example.

FIG. 15 is a sequence diagram that shows an additional example sequence flow 1500 that may be performed in relation to a cloud entity wrapper. FIG. 15 shows communications between three components: a request processor 1502, an entity service 1504 and storage 1506. The request processor 1502 may comprise one or more of the request server 1115, the entity identifier decoder 1120 and the triggers 1130 of FIG. 11. The request processor 1502 is configured to manage and process requests associated with particular computing entities. The entity service 1504 may comprise the entity service 1125 from FIG. 11. The entity service 1504 is configured to instantiate particular computing entities based on communications from the request processor 1502. The storage 1506 may comprise data store 1140 of FIG. 11. The storage 1506 may be local or remote, or a combination of local and remote. At least the request processor 1502 and the entity service 1504 may form part of the cloud entity wrapper, e.g. as shown as 1050 in FIG. 10 or as the general entity wrapper 1110 of FIG. 11. Although the example sequence flow 1500 is described with respect to a cloud entity wrapper, a similar sequence may also be performed by an edge entity wrapper, such as that shown in FIG. 10 or 12.

At block 1510, the request processor 1502 receives a request. The request may be an HTTP(S) request such as "GET https://api.glimpseprotocol.io/entity/v1/query" and/or another form of API request, e.g. from a local or remote application or kernel service. The request may comprise an identifier for a particular computing entity (e.g., the "id" from FIG. 8A). This may be provided in an encrypted and/or encoded form in either the request itself (e.g., in the request address) or in accompanying data such as an encrypted cookie. At block 1512, the request processor 1502 decrypts and/or decodes the identifier and determines the associated computing entity. This may also comprise obtaining a decryption key for the identified computing entity (or this may be performed at a later block). In certain cases, this may be performed by the entity identifier decoder 1120 of FIG. 11. At block 1514, the request processor 1502 sends a request to the entity service 1504 to instantiate the identified computing entity. This is received at block 1516. At block 1518, the entity service 1504 sends a request to the storage 1506 to retrieve computer program code and/or data associated with the identified computing entity. This is received by the storage 1506 at block 1520.

At block 1522, the storage 1506 retrieves the computer program code and/or data associated with the identified computing entity and returns it to the entity service 1504. The computer program code and/or data are preferably encrypted while stored by storage 1504, such that storage 1504 does not have access to the computer program code and data. They may be encrypted as a single set of data. At block 1524, the entity service 1504 receives the computer program code and/or data and decrypts it (if necessary) using an obtained decryption key for the computing entity. The decryption keys may be handled by the entity service 1504 and/or received from the request processor 1502. In one case, the computing entity may be implemented using generic computer program code. In this case, only the data for a particular computing entity may need to be encrypted. This data may be in the form of a state 800 as shown in FIG. 8A. At block 1524, an encrypted state may thus be received from the storage 1504, decrypted, and then loaded together with generic computer program code for a computing entity to instantiate a particular computing entity, e.g. that is associated with a particular user and/or computing device.

Instantiating a computing entity at block 1524 may also comprise determining a set of query agents that are implemented by the particular computing entity. This may comprise retrieving query agent data similar to that shown in FIG. 8B for one or more query agents. The query agents for a particular computing entity may be indicated by the state and may be included as part of the computing entity instantiation, such that the implemented computing entity has access to the query agents as shown in FIGS. 5 and 7.

Once instantiated at block 1524, data associated with the original request at block 1510 may be passed to the instantiated computing entity. For example, the request may be passed to a messaging component such as 520 in FIG. 5. During block 1524, the computing entity may process the request. This may be performed as shown in the previous examples, including the method 1300 of FIG. 13.

In the present example, the instantiated computing entity is no longer needed once the request has been processed (e.g., once a method similar to method 1300 has been performed). In this case, the state of the instantiated computing entity is updated (if necessary) and saved. The computing entity is then de-instantiated or put into a "sleep" state where it is no longer active. At block 1526, the entity service 1504 sends a request to the storage 1506 to save the updated computing entity. This may comprise encrypting one or more of computer program code and data for the computing entity (e.g., encrypting a state in a suitable form for secure storage). At block 1528, the storage 1506 receives the request and the updated data for the computing entity and saves this. At block 1530, the entity service 1504 arranges for any output generated by the computing entity during block 1524 to be forwarded as required. This may comprise forwarding information back to the request processor 1502 to allow a response to the original request to be sent at block 1532.

In the example of FIG. 15, neither the request processor 1502 or the storage 1506 have access to the computing entity and its private data. Any request and response may be suitably encrypted for an extra level of security. The entity service 1504 may be controlled such that it does not have access to the instantiated computing entity, e.g. this may be run in a different secure processing thread that is inaccessible to the entity service 1504. For example, the decryption key for a computing entity, the encrypted state and incoming query data may be passed to a code-signed secure processing thread that is tied to a TMP, e.g. on a server computing device. The instantiated computing entity may also use a secure area of memory that is inaccessible to the entity service 1504. As such, only the implemented computing entity has access to its private data and the external wrapper has no access to this private data. This combination of wrapper and computing entity may thus be used to securely implement the present examples in a variety of environments, including the "cloud" and "edge" cases that are specifically described.

In one case, block 1524 may comprise the operations of one or more of blocks 616, and 626 to 638 of FIG. 6. In this case, the edge device 606 may implement the request processor 1502 and the entity service 1504, and one or more blocks of the example sequence flow 1500 in FIG. 15 may be implemented at blocks 618, 624 and/or 640 of FIG. 6. By implementing computing entities "on demand" and saving state to storage 1504, an entity wrapper is able to free up resources when the computing entity is not required. For a cloud entity wrapper, this may enable the wrapper to efficiently implement a plurality of computing entities in series and/or parallel, while avoiding any security leaks between independent computing entities. For mobile computing devices, this may conserve battery power. Different computing entity management configurations may be applied as desired, e.g. computing entities may also be instantiated in response to internal and/or external triggers (such as 1130 in FIG. 11), may be maintained for a set time period in case of additional requests, may be updated periodically etc. The number of computing entities that are implemented at any one time may be set based on dynamic system characteristics, e.g. similar to load balancing systems. As similar processes may be applied for both edge and cloud implementations, the present examples may be implemented both on specific computing devices and on server computing devices (e.g., computing entities as a service).

In certain examples described herein a secured execution space may be provided by a number of different security elements. This may be provided separately, or in any combination, depending on a desired level of security. One element may comprise a set of categorised security "rings". These may indicate different levels of access and/or permissions. A "most secure" ring may comprise the computing entity. This is deemed a completely trusted system. A "least secure" ring may comprise one or more of the components shown in FIG. 3. These may be completely untrusted. A ring above the "most secure" ring may comprise the entity wrapper implementations. These may not have access to the private data of the computing entities (e.g., such as the state of FIG. 8A), but may have access to generic computer program code and non-private configuration data (e.g., the query agent configuration data of FIG. 8B in certain examples). In one implementation, the execution of query agents may be sandboxed or otherwise isolated from the computing entity, and the computing entity may be sandboxed or otherwise isolated from processes of an entity wrapper. The definition of security rings may be used to monitor messages and/or data communicated across a ring boundary. For example, all data that is communicated across the boundary of the most secure ring for the computing entity may be monitored to check against data leakage. In addition, data may only be communicated between rings at designated gateway devices, where security process may be implemented at the designated gateway devices. Security monitoring may include restricting read and/or writes to certain portions of memory and/or state.

Use Cases and Other Examples

The examples described herein may be used in a variety of contexts and cases. Examples involving location and heart rate sensor data have been described, however, private data may comprise any data relating to a user and/or a computing or technical system. In one case, the private data may store a user profile. This may have information such as age, sex, home location etc. This may be used to provide targeted content to a user without providing the information over untrusted or trustless networks to untrusted, trustless or even hypothetically "trusted" devices outside of a computing entity. The computing entity thus represents a form of secure "vault" for the private data. For example, a user may wish to look up activities to perform in a new city. In comparative examples, this may comprise sending data such as a user's age, sex, location and activity preferences over one or more untrusted networks. Even if the communications and the end points were secured (e.g., using encrypted HTTPS communications and end-point encryption), the user now has no control over that data. If the end point was compromised by malicious parties who were able to obtain or crack cryptographic keys then that data may be decrypted, distributed and/or used maliciously. For example, the user has no control over the level of encryption used, the bit-length of keys, the algorithms used, the computing platforms and hardware used, and/or whether encryption is post-quantum secure. However, in the present case, third parties in a particular location may supply query data to a user's device that implements a computing entity, and the computing entity may determine if that query data matches the user's private data. For example, the computing entity may indicate that a user is over 21 and so may be shown the location of bars without that information being collatable with other information (such as location or sex of the user).

Other examples may include cases where a government agency (e.g., state or federal) wishes to send important emergency information videos to particular sets of users. For example, users who are over 65 may need to be told to quarantine if there is an outbreak of disease. The outbreak may also vary with location. Using these examples, video content may be provided to over 65 s in a particular location without private data on age or location being leaked into an untrusted distributed computing system. There is also no need to maintain a central database and thus greatly reduces the technical burden of any implementation. In certain cases, the identifiers described herein may be used for addressing data delivery, meaning that even network addresses such as IP addresses may be hidden from third party devices (e.g., even HTTPS communications require an IP address to perform an initial key exchange protocol). As another example, an organisation may send commands that control a large set of "bring-your-own-devices" without needing to receive information from those devices. For example, the patching of an operating system typically requires computing devices to send sensitive information on a computer configuration to a third party. Typically, this is managed by having a trusted third party. However, in the present examples, an untrusted third party may provide this management without the third party receiving private data from the computing devices it is managing. In certain cases, a computing entity may be associated with a state-issued form of identification, such as a digital passport or driving license. In this case, the methods described herein may be used for census data collection and/or voting. Methods may also be used more generally for secure website authentication.

The present examples may be thought of as a private data architecture that establishes a user or entity-centric data model. In this case, third parties can query data and devices without accessing the actual data or devices. The present examples provide a solution that uses a distributed architecture that incorporates advanced cryptographic approaches. The examples may be considered a technical implementation of a "trust layer" or "trust service", where third party devices may query client devices within a "trustless" context, i.e. where only the computing entity implemented by the client device is truly trusted. The use of use-limited or ephemeral identifiers provide forward secrecy (e.g., in aggregate) while also allowing matched entities to be interrogated further. The present examples may be compared with comparative solutions where private data is transmitted with a user's consent and the external security implementations always need to be trusted in some form.

In yet another example, the present approaches may be applied in distributed machine learning and/or modelling applications. This may be particularly useful for large numbers of sensor devices that are heterogeneously controlled, e.g. for querying large numbers of devices across different organisations and locations. For example, a query may be used to provide data to build probability distributions; in this case, a number of received identifiers may be used to determine proportions and/or as a basis for further communications using the described digital signatures. Machine learning models may also be provided in a similar manner to query agents. Machine learning models may have access to certain portions of private data to provide local classifications (e.g. of raw data) and/or to generate attribute data for querying. For example, certain characteristics of a user and/or a computing device may be predicted by a machine learning model based on raw data generated by the computing device or coupled sensor.

Certain system components and methods described herein may be implemented by way of computer program code that is storable on a non-transitory storage medium, e.g. the methods of FIGS. 13 and 14 may be implemented on a computing device as described with reference to FIG. 4. The above examples are to be understood as illustrative. Further examples are envisaged. Although certain components of each example have been separately described, it is to be understood that functionality described with reference to one example may be suitably implemented in another example, and that certain components may be omitted depending on the implementation. It is to be understood that any feature described in relation to any one example may be used alone, or in combination with other features described, and may also be used in combination with one or more features of any other of the examples, or any combination of any other of the examples. For example, features described with respect to the system components may also be adapted to be performed as part of the described methods. Furthermore, equivalents and modifications not described above may also be employed without departing from the scope of the invention, which is defined in the accompanying claims.

The invention claimed is:

1. A method for secure selective content distribution comprising:
   obtaining, at a given client computing entity within a set of client computing entities, query data from a messaging service, the query data comprising criteria for the distribution of content to the set of client computing entities;
   within a secured execution space for the given client computing entity, matching a query defined by the query data against private data for the client computing entity;
   responsive to a positive match for the query:
      obtaining, for the given client computing entity, a use-limited private-public key pair for the query, wherein the use-limited private-public key pair is a private-public key pair that is determined for the query, wherein different use-limited private-public key pairs are obtained for subsequent queries;
      generating a query result package, the query result package comprising the public key as an identifier for the given client computing entity, the query result package acting as a zero knowledge attestation; and
      providing the query result package to the messaging service,
   wherein the given client computing entity is configured to obtain content associated with the query that is addressed to the identifier for processing at the given client computing entity, and
   wherein the given client computing entity is configured to use the private key of the private-public key pair to authenticate communications that relate to the query.

2. The method of claim 1, comprising:
   digitally signing the query result package with the private key of the private-public key pair.

3. The method of claim 1, wherein generating the query result package comprises:
   computing, at the given client computing entity, a proof-of-work and including the proof-of-work within the query result package.

4. The method of claim 1, comprising, following the transmitting:
   performing an action associated with the query defined by the query data; and
   transmitting a message following the action, the message being digitally signed using the private key of the private-public key pair, the message indicating that the action was performed by a client computing entity that had a successful match for the query defined by the query data.

5. The method of claim 1, comprising:
   within the secured execution space for the given client computing entity, matching a further query against the private data for the client computing entity, the further query comprising at least a determination of whether the query defined by the query data resulted in a successful match;
   responsive to a positive match for the further query:
      obtaining, for the given client computing entity, a further use-limited private-public key pair for the further query;
      using the public key of the further use-limited private-public key pair as a further identifier for the computing entity;
      generating a further query result package based on the successful match for the further query, the further query result package comprising the generated further identifier, the query result package acting as a zero knowledge attestation; and
      providing the further query result package in response to an action associated with the query defined by the query data,
   wherein the further query result package indicates that the action was performed by a client computing entity that had a successful match for the query defined by the query data.

6. The method of claim 1, wherein obtaining a use-limited private-public key pair comprises, at the given client computing device:
   obtaining a root seed; and
   generating the use-limited private-public key pair as a unique path through a key generation tree starting with a start node, the key generation tree being based on the root seed,
   wherein the private-public key pair are retrievable using an address of the unique path.

7. The method of claim 6, wherein obtaining the root seed comprises:
   retrieving a mnemonic from the private data of the given client computing entity, the mnemonic comprising a string sequence;
   using the mnemonic to retrieve the root seed by applying a hash function to the string sequence.

8. The method of claim 6, wherein obtaining the root seed comprises:
   retrieving a biometric bit sequence from a trusted platform module for the given client computing device; and
   using the biometric bit sequence to compute the root seed.

9. The method of claim 6, further comprising, following generation of the use-limited private-public key pair:
   pairing the unique path with the query within the private data; and
   retrieving the use-limited private-public key pair to authenticate further communications relating to the query by retrieving the unique path paired with the query.

10. The method of claim 9, wherein a predefined branch of the key generation tree is reserved for use in encrypting one or more of the given client computing entity and the private data.

11. The method of claim 1,
    wherein the query is defined as an action to be performed on a state for the client computing entity, the given client computing entity being configured to queue a plurality of actions for access to the state; and
    wherein matching a query defined by the query data comprises writing an outcome of the match for the query to the state for use in generating the query result package.

12. The method of claim 1, wherein obtaining query data from the messaging service and providing the query result package to the messaging service respectively comprise one or more of:
    reading and writing data from a distributed ledger; and
    reading and writing data from a distributed file system.

13. The method of claim 1, comprising:
    determining a number of queries that have query data available at the messaging service;
    determining a number of query result packages that have been received at the messaging service from the set of client computing entities; and varying query data for one or more available queries based on the determined number of queries and the determined number of query result packages.

14. The method of claim 1, wherein the given client computing entity is implemented as one of:
a secure process on a server computing device, the server computing device implementing a plurality of client computing entities associated with a corresponding plurality of users;
a secure process on a mobile computing device associated with a user.

15. The method of claim 1, comprising:
obtaining, at the given client computing entity, content addressed to the identifier from the messaging service;
executing a process to actuate the content; and
performing an action related to the content following the actuation of the content,
wherein the action comprises communicating data that is digitally signed using the private key of the use-limited private-public key pair.

16. The method of claim 1, wherein the content comprises one or more of: executable program code for execution by the given client computing entity, image data for display by the given client computing entity, video data for display by the given client computing entity, audio data for output by the given client computing entity, and a command for execution by the given client computing entity.

17. A non-transitory computer-readable storage medium storing instructions that, when executed by a processor, cause the processor to:
obtain query data from a messaging service, the query data comprising criteria for the distribution of content to a set of client computing entities;
within a secured execution space for the processor, match a query defined by the query data against private data; and
responsive to a positive match for the query:
obtain a use-limited private-public key pair for the query, wherein the use-limited private-public key pair is a private-public key pair that is determined for the query, wherein different use-limited private-public key pairs are obtained for subsequent queries;
generate a query result package, the query result package comprising the public key as an identifier for the processor, the query result package acting as a zero knowledge attestation; and
provide the query result package to the messaging service,
wherein the processor is configured to obtain content associated with the query that is addressed to the identifier for processing at the processor, and
wherein the processor is configured to use the private key of the private-public key pair to authenticate communications that relate to the query.

18. A computing device for implementing a client computing entity for secure selective content distribution, the computing device comprising:
a memory to store computer program code that implements the client computing entity;
at least one processor to execute the computer program code to implement the client computing entity;
a network interface for communicating over at least one network;
a data storage interface for communicating with one or more storage devices, the one or more storage devices storing private data for the client computing entity;
wherein the computer program code comprises instructions that cause the at least one processor to:
obtain, via the network interface, query data from a messaging service;
within a secured execution space for the client computing entity, match a query defined by the query data against the private data accessible via the data storage interface;
obtain, for the client computing entity, a use-limited private-public key pair for the query, wherein the use-limited private-public key pair is a private-public key pair that is determined for the query, wherein different use-limited private-public key pairs are obtained for subsequent queries;
use the public key of the use-limited private-public key pair as an identifier for the client computing entity;
generate a query result package conditional on a positive match for the query, the query result package comprising the identifier and a digital signature generated using the private key of the use-limited private-public key pair, the query result package acting as a zero knowledge attestation; and
transmit, via the network interface, the query result package to the messaging service,
wherein the computing device is configured to obtain content for the computing entity addressed to the identifier, and
wherein the private key of the private-public key pair is used to authenticate further communications from the computing entity that relate to the query.

19. The computing device of claim 18, wherein the computing device implements a cloud entity wrapper that instantiates a plurality of client computing entities, wherein the one or more storage devices store computer program code for the plurality of client computing entities that is accessed via the data storage interface, and wherein the cloud entity wrapper is configured to selectively activate ones of the plurality of client computing entities to match the query.

20. The computing device of claim 19, wherein the cloud entity wrapper comprises:
a request server to receive requests from applications or processes;
an entity identifier decoder to determine a client computing entity identifier associated with a request received by the request server;
an entity service to instantiate a client computing entity based on a client computing entity identifier received from the entity identifier decoder;
a messaging service interface to allow an instantiated client computing entity to communicate with the messaging service; and
one or more monitoring services to determine if one or more of a set of triggers are met, each trigger in the set of triggers comprising a set of conditions and a client computing entity identifier,
wherein an instantiated client computing entity matches the query defined by the query data, and
wherein the one or more monitoring services are configured to signal to the entity service to instantiate a client computing entity based on a client computing entity identifier associated with a met trigger.

* * * * *